US011955716B2

(12) United States Patent
Tang et al.

(10) Patent No.: US 11,955,716 B2
(45) Date of Patent: Apr. 9, 2024

(54) POLYMER-BASED DIPOLE RADIATING ELEMENTS WITH GROUNDED COPLANAR WAVEGUIDE FEED STALKS AND CAPACITIVELY GROUNDED QUARTER WAVELENGTH OPEN CIRCUITS

(71) Applicant: CommScope Technologies LLC, Hickory, NC (US)

(72) Inventors: Chengcheng Tang, Murphy, TX (US); Xiangyang Ai, Plano, TX (US); Peter J. Bisiules, LaGrange Park, IL (US)

(73) Assignee: CommScope Technologies LLC, Claremont, NC (US)

( * ) Notice: Subject to any disclaimer, the term of this patent is extended or adjusted under 35 U.S.C. 154(b) by 333 days.

(21) Appl. No.: 17/630,725

(22) PCT Filed: Oct. 8, 2020

(86) PCT No.: PCT/US2020/054716
§ 371 (c)(1),
(2) Date: Jan. 27, 2022

(87) PCT Pub. No.: WO2021/072032
PCT Pub. Date: Apr. 15, 2021

(65) Prior Publication Data

US 2022/0263248 A1 Aug. 18, 2022

Related U.S. Application Data

(60) Provisional application No. 62/912,879, filed on Oct. 9, 2019.

(51) Int. Cl.
*H01Q 1/24* (2006.01)
*H01Q 1/38* (2006.01)
(Continued)

(52) U.S. Cl.
CPC ........... *H01Q 21/062* (2013.01); *H01Q 1/246* (2013.01); *H01Q 1/38* (2013.01); *H01Q 9/065* (2013.01); *H01Q 9/285* (2013.01); *H01Q 19/108* (2013.01)

(58) Field of Classification Search
CPC ........ H01Q 21/062; H01Q 1/246; H01Q 1/38; H01Q 9/065; H01Q 9/285; H01Q 19/108
See application file for complete search history.

(56) References Cited

U.S. PATENT DOCUMENTS 6,211,840 B1 4/2001 Wood et al.
2004/0244187 A1 12/2004 Annamaa et al.
(Continued)

FOREIGN PATENT DOCUMENTS

CN 201868574 U 6/2011
WO 2021252059 A1 12/2021

OTHER PUBLICATIONS

Notification of Transmittal of the International Search Report and the Written Opinion of the International Searching Authority, or the Declaration, in corresponding PCT Application No. PCT/US2020/054716 (dated Feb. 8, 2021).

*Primary Examiner* — Joseph J Lauture
(74) *Attorney, Agent, or Firm* — Myers Bigel, P.A.

(57) ABSTRACT

A cross-dipole radiating element includes first and second polymer-based coplanar waveguide feed stalks, and first and second pairs of polymer-based radiating arms, which are supported by and electrically coupled to the first and second coplanar waveguide feed stalks. These polymer-based feed stalks and radiating arms are configured as a unitary polymer substrate, which is selectively metallized to define a cross-dipole radiating element. The first and second feed stalks may be configured as finite grounded coplanar waveguide (GCPW) feed stalks, which are spaced-apart from each other
(Continued)

on an underlying polymer base. The unitary polymer substrate may include the polymer base.

20 Claims, 25 Drawing Sheets

(51) Int. Cl.

| | |
|---|---|
| ***H01Q 9/06*** | (2006.01) |
| ***H01Q 9/28*** | (2006.01) |
| ***H01Q 19/10*** | (2006.01) |
| ***H01Q 21/06*** | (2006.01) |

(56) References Cited

U.S. PATENT DOCUMENTS

| | | | |
|---|---|---|---|
| 2005/0253769 | A1 | 11/2005 | Timofeev et al. |
| 2013/0141307 | A1 | 6/2013 | Nurnberger et al. |
| 2018/0323513 | A1 | 11/2018 | Varnoosfaderani et al. |
| 2018/0337443 | A1* | 11/2018 | Bisiules ................. H01Q 1/246 |
| 2019/0081411 | A1 | 3/2019 | Isom et al. |
| 2021/0021019 | A1 | 1/2021 | Hou et al. |

* cited by examiner

POLYMER-BASED DIPOLE RADIATING ELEMENTS WITH GROUNDED COPLANAR WAVEGUIDE FEED STALKS AND CAPACITIVELY GROUNDED QUARTER WAVELENGTH OPEN CIRCUITS

REFERENCE TO RELATED APPLICATIONS

This application is a 35 U.S.C. § 371 national stage application of PCT Application No. PCT/US2020/054716, filed on Oct. 8, 2020, claims priority to U.S. Provisional Application Ser. No. 62/912,879, filed Oct. 9, 2019, the disclosures of which are hereby incorporated herein by reference. The above-referenced PCT Application was published in the English language as International Publication No. WO 2021/072032 A1 on Apr. 15, 2021.

CROSS-REFERENCE TO RELATED APPLICATIONS

This application is related to U.S. application Ser. No. 16/927,580, filed Jul. 13, 2020, and U.S. Provisional Application Ser. No. 63/037,851, filed Jun. 11, 2020, the disclosures of which are hereby incorporated herein by reference.

FIELD OF THE INVENTION

The present invention relates to radio communications and, more particularly, to radiating elements for base station antennas used in cellular communication systems.

BACKGROUND

Cellular communications systems are well known in the art. In a cellular communications system, a geographic area is divided into a series of regions that are referred to as "cells" which are served by respective base stations. The base station may include one or more base station antennas that are configured to provide two-way radio frequency ("RF") communications with mobile subscribers that are within the cell served by the base station. In many cases, each base station is divided into "sectors." In perhaps the most common configuration, a hexagonally shaped-cell is divided into three 120° sectors, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In order to accommodate the ever-increasing volume of cellular communications, cellular operators have added cellular service in a variety of new frequency bands. Cellular operators have applied a variety of approaches to support service in these new frequency bands, including deploying linear arrays of "wide-band" radiating elements that provide service in multiple frequency bands, and deploying multi-band base station antennas that include multiple linear arrays (or planar arrays) of radiating elements that support service in different frequency bands. These linear arrays are mounted in a side-by-side fashion.

SUMMARY OF THE INVENTION

A dipole radiating element according to an embodiment of the invention includes a polymer-based coplanar waveguide feed stalk, and a polymer-based pair of radiating arms, which are supported by and electrically coupled to the coplanar waveguide feed stalk. In some of these embodiments, the coplanar waveguide feed stalk is a finite grounded coplanar waveguide (GCPW) feed stalk. And, in other embodiments of the invention, the radiating arms and feed stalk may comprise, or consist essentially of, partially metallized injection molded (IM) plastic. A reflector may also be provided, upon which the GCPW stalk is supported. This reflector can be electrically coupled to a metallized ground plane on the GCPW feed stalk.

In some additional embodiments of the invention, a first of the pair of radiating arms is electrically coupled to a feed conductor on the GCPW feed stalk and a second of the pair of radiating arms is electrically coupled to a metallized ground plane on the GCPW feed stalk. For example, the feed conductor can be provided on a first side of the GCPW feed stalk and the metallized ground plane can be provided on a second side (and partially on the first side) of the GCPW feed stalk. The feed conductor can also be centered between first and second portions of the metallized ground plane on the first side of the GCPW feed stalk. In addition, the GCPW feed stalk may include a plurality of plated through-holes therein, so that the first and second portions of the metallized ground plane on the first side of the GCPW feed stalk are electrically coupled by the plurality of plated through-holes to a third portion of the metallized ground plane on the second side of the GCPW feed stalk. Advantageously, the third portion of the metallized ground plane and the second of the pair of radiating arms may be collectively configured as an uninterrupted layer of metallization that extends between the third portion of the metalized ground plane and a rear-facing surface of the second of the pair of radiating arms. In addition, the feed conductor and the first of the pair of radiating arms may be collectively configured as an uninterrupted layer of metallization that extends between the feed conductor and a rear-facing surface of the first of the pair of radiating arms. The second of the pair of radiating arms can also be configured to have at least one metallized through-hole therein, so that the uninterrupted layer of metallization that extends from the third portion of the metalized ground plane also extends through the at least one metallized through-hole and onto a front-facing surface of the second of the pair of radiating arms.

According to additional embodiments of the invention, a cross-dipole radiating element includes a first polymer-based coplanar waveguide feed stalk, a second polymer-based coplanar waveguide feed stalk, and first and second pairs of polymer-based radiating arms supported by and electrically coupled to the first and second coplanar waveguide feed stalks. In some of these embodiments, the first and second pairs of polymer-back radiating arms are configured as a quad-arrangement of double-sided metallized radiating elements, which share a common unitary polymer substrate with the first and second coplanar waveguide feed stalks. These first and second coplanar waveguide feed stalks may be configured as first and second grounded coplanar waveguide (GCPW) feed stalks, respectively, with a first feed conductor provided on a first side of the first GCPW feed stalk and a first metallized ground plane provided on a second side (and on the first side) of the first GCPW feed stalk. A second feed conductor is also provided on a first side of the second GCPW feed stalk and a second metallized ground plane is provided on a second side (and on the first side) of the second GCPW feed stalk.

In addition, a first of the first pair of radiating arms is electrically coupled to the first feed conductor on the first GCPW feed stalk and a second of the first pair of radiating arms is electrically coupled to the first metallized ground plane on the first GCPW feed stalk. A first of the second pair of radiating arms is electrically coupled to the second feed conductor on the second GCPW feed stalk and a second of the second pair of radiating arms is electrically coupled to the second metallized ground plane on the second GCPW feed stalk. In some of these embodiments of the invention, the first feed conductor and the first of the first pair of radiating arms are collectively configured as an uninterrupted layer of metallization that extends between the first feed conductor and a forward-facing surface of the first of the first pair of radiating arms, and the second feed conductor and the first of the second pair of radiating arms are collectively configured as an uninterrupted layer of metallization that extends between the second feed conductor and a rear-facing surface of the first of the second pair of radiating arms.

A dipole radiating element according to further embodiments of the invention includes a polymer base having front and rear facing surfaces thereon, a polymer-based coplanar waveguide feed stalk on a front facing surface of the polymer base, and a polymer-based pair of radiating arms supported by and electrically coupled to the coplanar waveguide feed stalk. A reflector is also provided, upon which the polymer base is supported. This reflector may be electrically coupled by a self-clinch fastener (SCF) to the metallized ground plane on the feed stalk. An air microstrip feedline is also provided, which extends on a rear facing surface of the polymer base and opposite the reflector. The air microstrip feedline is electrically coupled to a feed conductor on the feed stalk. In particular, the air microstrip feedline can be spaced-apart from the reflector by an air gap, the feed conductor can extend through an opening in the polymer base, and the feed conductor and the air microstrip feedline can be collectively configured as an uninterrupted layer of metallization, which extends from the rear facing surface of the polymer base to a first one of the pair of radiating arms.

According to further embodiments of the invention, instead of providing a direct DC "short" between the reflector and a feed stalk ground plane using, for example, one or more SCFs (or other electrical interconnect structures), a first open circuit terminal may be provided to operate as a high frequency AC "short." In particular, this first open circuit terminal, which extends on the rear facing surface of the polymer base, may be configured as patterned metallization that is capacitively coupled to a first electrically conductive portion of the reflector, and directly connected (through the opening in the polymer base) to a first portion of a metallized ground plane on the GCPW feed stalk. In some of these embodiments of the invention, the first open circuit terminal may be configured as an arc-shaped metallization pattern on the rear facing surface of the polymer base.

According to additional embodiments of the invention, a dipole radiating element is provided, which includes a feed stalk and a polymer-based pair of radiating arms supported by the feed stalk. The pair of radiating arms includes a first radiating arm having a metallized forward-facing surface thereon. This forward-facing surface includes: (i) a peripheral metal trace, which defines a metallized perimeter of the first radiating arm, and (ii) a cross-arm metal trace, which extends between first and second portions of the peripheral metal trace and partitions the forward-facing surface of the radiating arm into at least two unmetallized forward-facing regions. In some of these embodiments, the first and second portions of the peripheral metal trace are on respective first and second "opposing" sides of the first radiating arm, which intersect each other at a distal end of the first radiating arm. At least a majority of the rear-facing surface of the first radiating arm may be metallized. In addition, the peripheral metal trace can wrap around an edge of the first radiating arm and electrically connect the metallization on the rear-facing surface of the first radiating arm to the metallization on the forward-facing surface of the first radiating arm. The first radiating arm may also include a "centrally-located" metallized through-hole therein, which electrically connects the cross-arm metal trace to a metallized portion of the rear-facing surface of the first radiating arm. The at least two unmetallized forward-facing regions may include a generally triangular-shaped region and a polygonal-shaped region having first and second sides that span respective first and second concentric arcs.

According to additional embodiments of the invention, the feed stalk is a polymer-based feed stalk having a feed conductor on a first surface thereof and a ground plane on a second surface thereon. A pair of ground plane conductors may also be provided on the first surface of the feed stalk. In addition, the feed stalk may include metallized sides that electrically connect the ground plane to the pair of ground plane conductors, and the feed conductor may extend between these pair of ground plane conductors.

In additional embodiments of the invention, a polymer base may be provided, upon which the feed stalk is mounted. A polymer support post may also be provided, which extends between a forward facing surface of the polymer base and an unmetallized portion of a rear facing surface of the first radiating arm. The polymer base may have an opening therein, through which the feed conductor extends. A pair of unequally-sized metallization patterns may also be provided, which extend on a rear-facing surface of the polymer base and are electrically coupled to respective ones of the pair of ground plane conductors on the first surface of the feed stalk. The pair of unequally-sized metallization patterns can include a smaller arc-shaped metallization pattern and a larger metallization pattern having three or more sides. Advantageously, these metallization patterns may operate as respective $\lambda/4$ open-circuit patterns that function as transmission lines and provide radio-frequency (RF) short-circuits (i.e., RF grounding) for corresponding feed stalks, but without requiring a direct galvanic connection to an underlying reflector, which is often unsolderable due to its material characteristics.

According to further embodiments of the invention, a dipole radiating element is provided with a polymer base having an opening therein. First and second polymer-based coplanar waveguide feed stalks are provided on a forward-facing surface of the polymer base, adjacent the opening. A first feed conductor and a first pair of ground plane conductors are provided on a first surface of the first feed stalk, and a second feed conductor and a second pair of ground plane conductors are provided on a first surface of the second feed stalk. First and second unequally-sized metallization patterns may also be provided on a rear-facing surface of the polymer base. The first metallization pattern has first and second terminals electrically connected to a first one of the first pair of ground plane conductors and a first one of the second pair of ground plane conductors. The second metallization pattern has first and second terminals electrically connected to a second one of the first pair of ground plane conductors and a second one of the second pair of ground plane conductors. In some of these embodiments of the invention, at least one of the first and second metallization patterns is a generally arc-shaped metallization pattern. The opening in the polymer base also has metal traces on sidewalls thereof, which electrically connect the terminals of the first and second unequally-sized metallization patterns to corresponding ones of the ground plane conductors within the first and second pairs of ground plane conductors According to a further embodiment of the invention, an antenna is provided, which includes an array of radiating elements configured as a unitary arrangement of: (i) a plurality of polymer-based radiating arms, (ii) a polymer-based base, and (iii) a plurality of polymer-based feed stalks, which extend between a forward-facing surface of the base and corresponding ones of the radiating arms. The base includes a plurality of metallized through-hole vias therein, which are distributed across the base. Advantageously, the metallized through-hole vias can be used to support the electroplating of first metallized traces on a rear-facing surface of the base using a first subset of the plurality of metallized through-hole vias as first electroplating terminals—to thereby provide a first base configuration that electrically couples the radiating arms into a first plurality of radiating groups. Alternatively, the metallized through-hole vias can be used to support the electroplating of second metallized traces on the rear-facing surface of the base using a second subset of the plurality of metallized through-hole vias as second electroplating terminals—to thereby provide a second base configuration that electrically couples the radiating arms into a second plurality of radiating groups, which differ from the first plurality of radiating groups.

Moreover, in some additional embodiments of the invention, the first subset of the plurality of metallized through-hole vias partially overlaps with the second subset of the plurality of metallized through-hole vias. The first subset of the plurality of metallized through-hole vias may also be arranged into a first plurality of linear arrays of vias. Similarly, the second subset of the plurality of metallized through-hole vias may be arranged into a second plurality of linear arrays of vias, and at least some of the first plurality of linear arrays of vias may be collinear with respective ones of the second plurality of linear arrays of vias.

DETAILED DESCRIPTION OF EMBODIMENTS

Figure 1A:
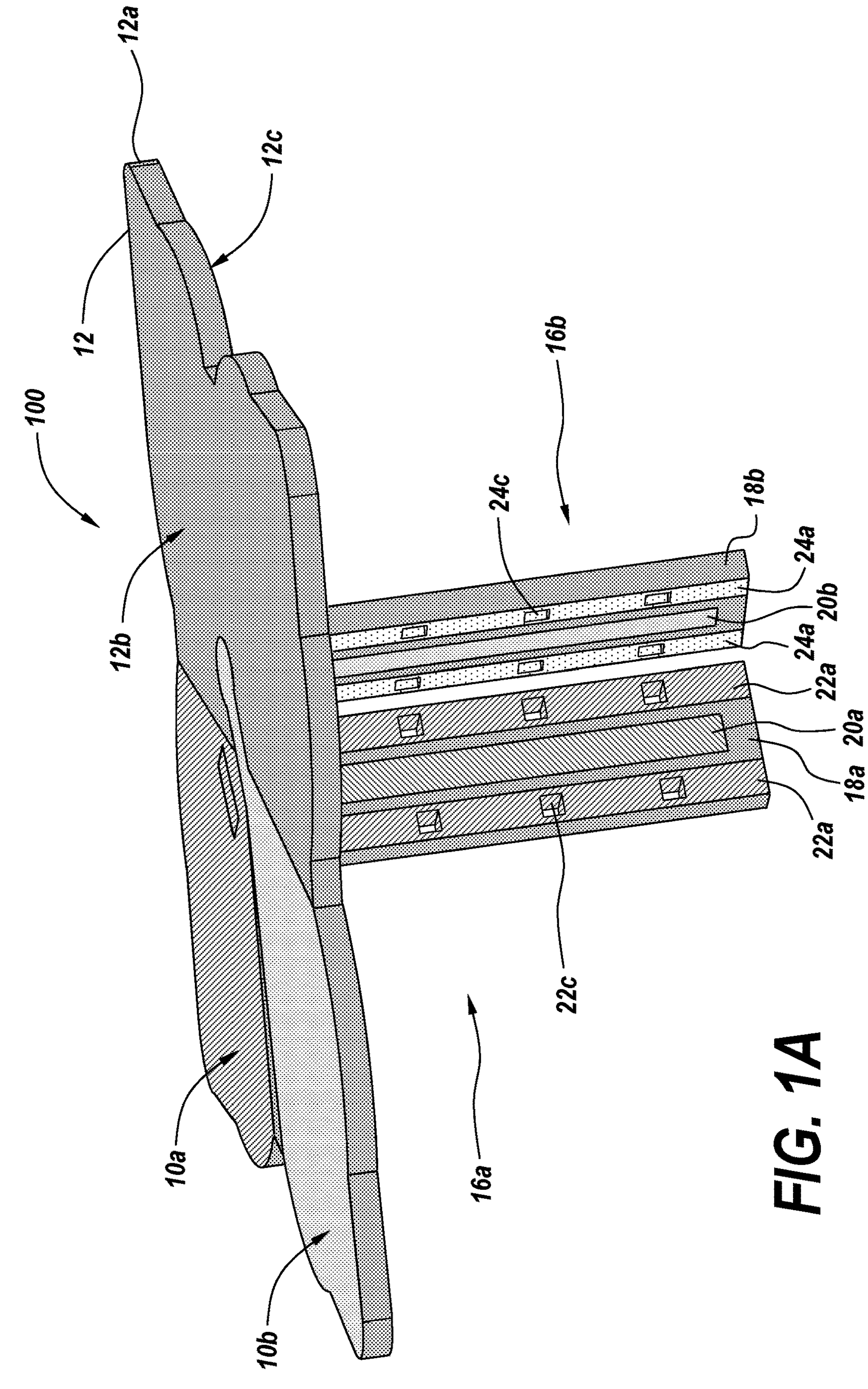
FIG. 1A is a side perspective view of a polymer-based cross-dipole radiating element according to an embodiment of the invention.
Figure 1B:
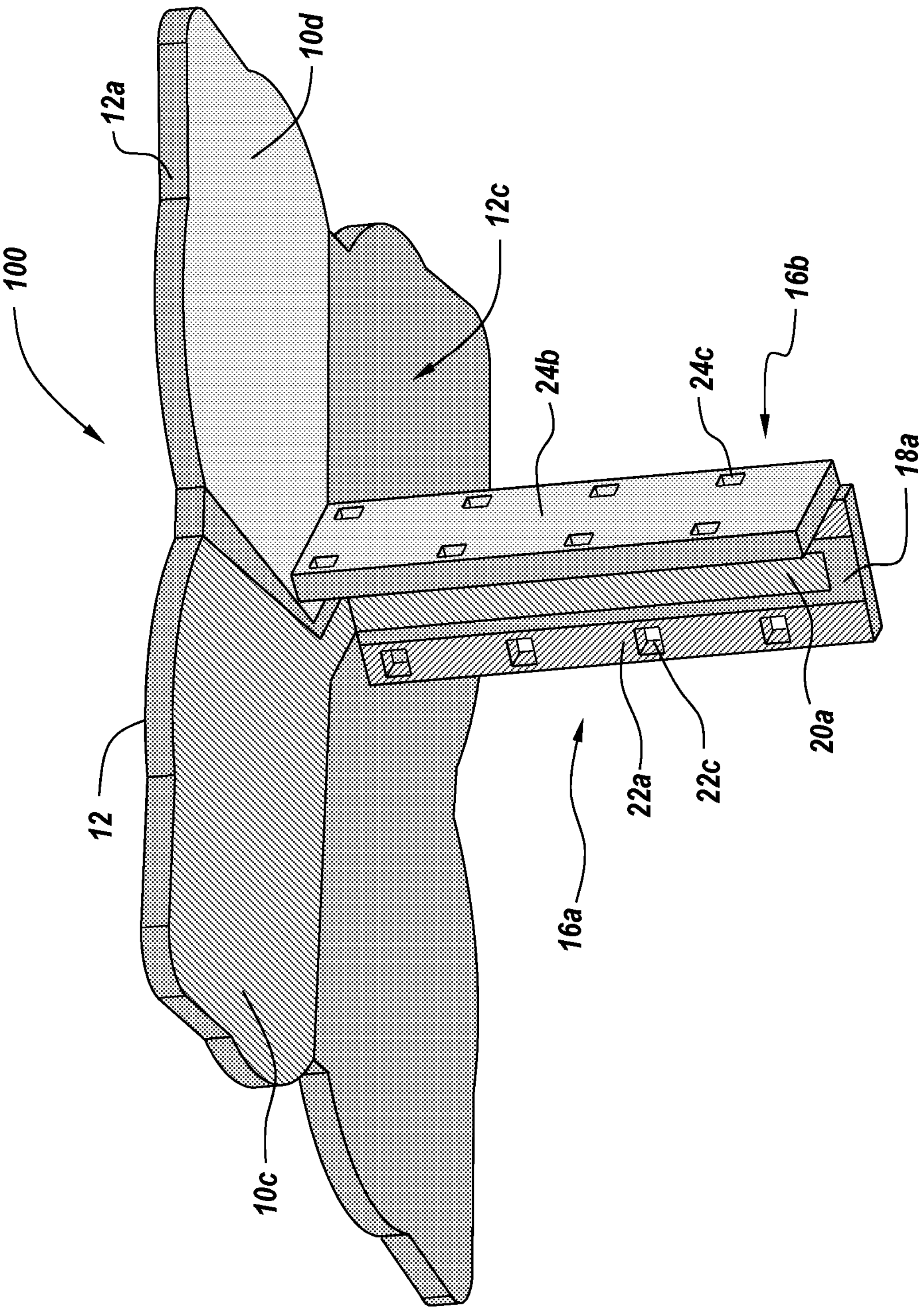
FIG. 1B is a perspective view of a rear side of the polymer-based cross-dipole radiating element of FIG. 1A, according to an embodiment of the invention.
Figure 1C:
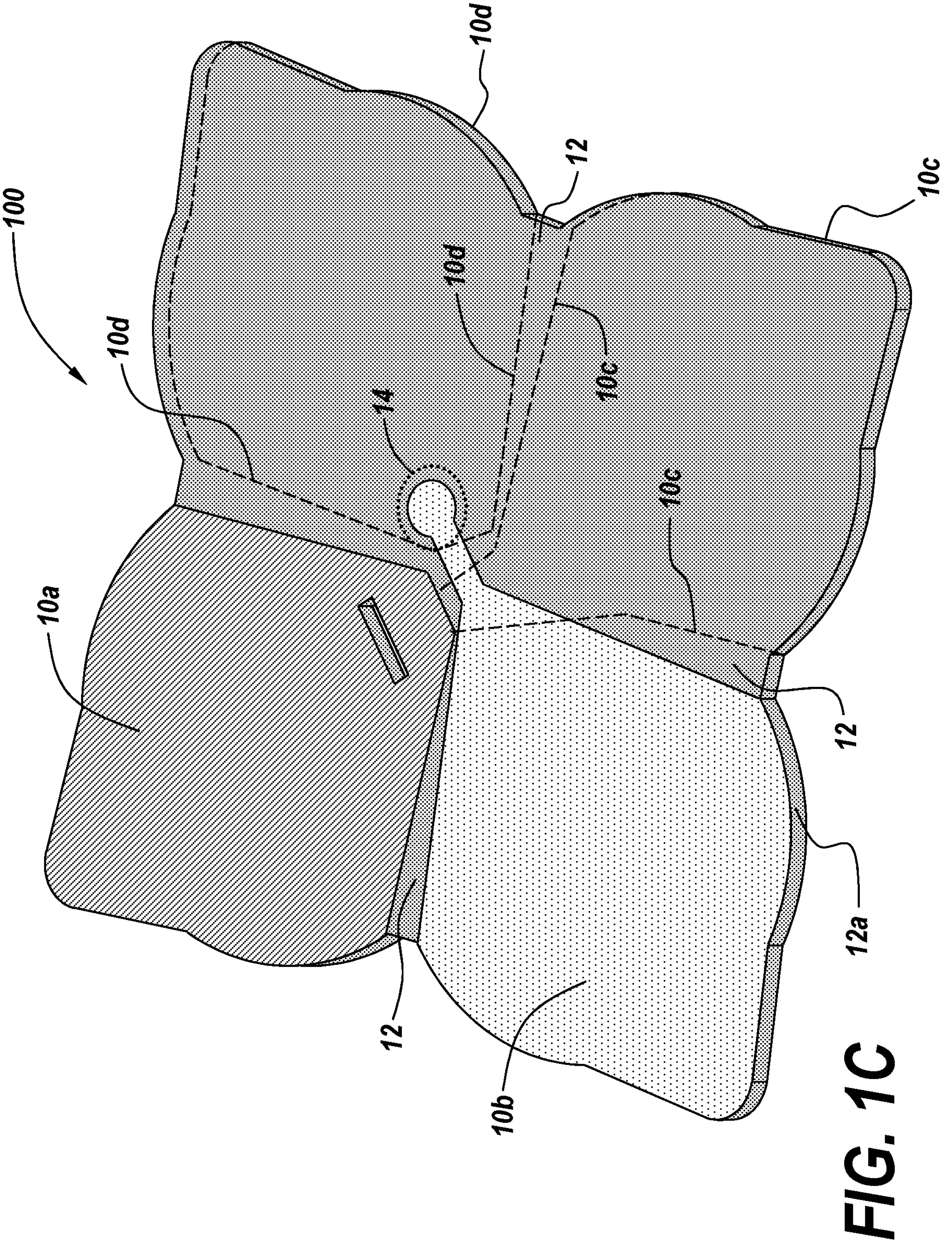
FIG. 1C is an elevated perspective view of the polymer-based cross-dipole radiating element of FIGS. 1A-1B, according to an embodiment of the invention.
Figure 1D:
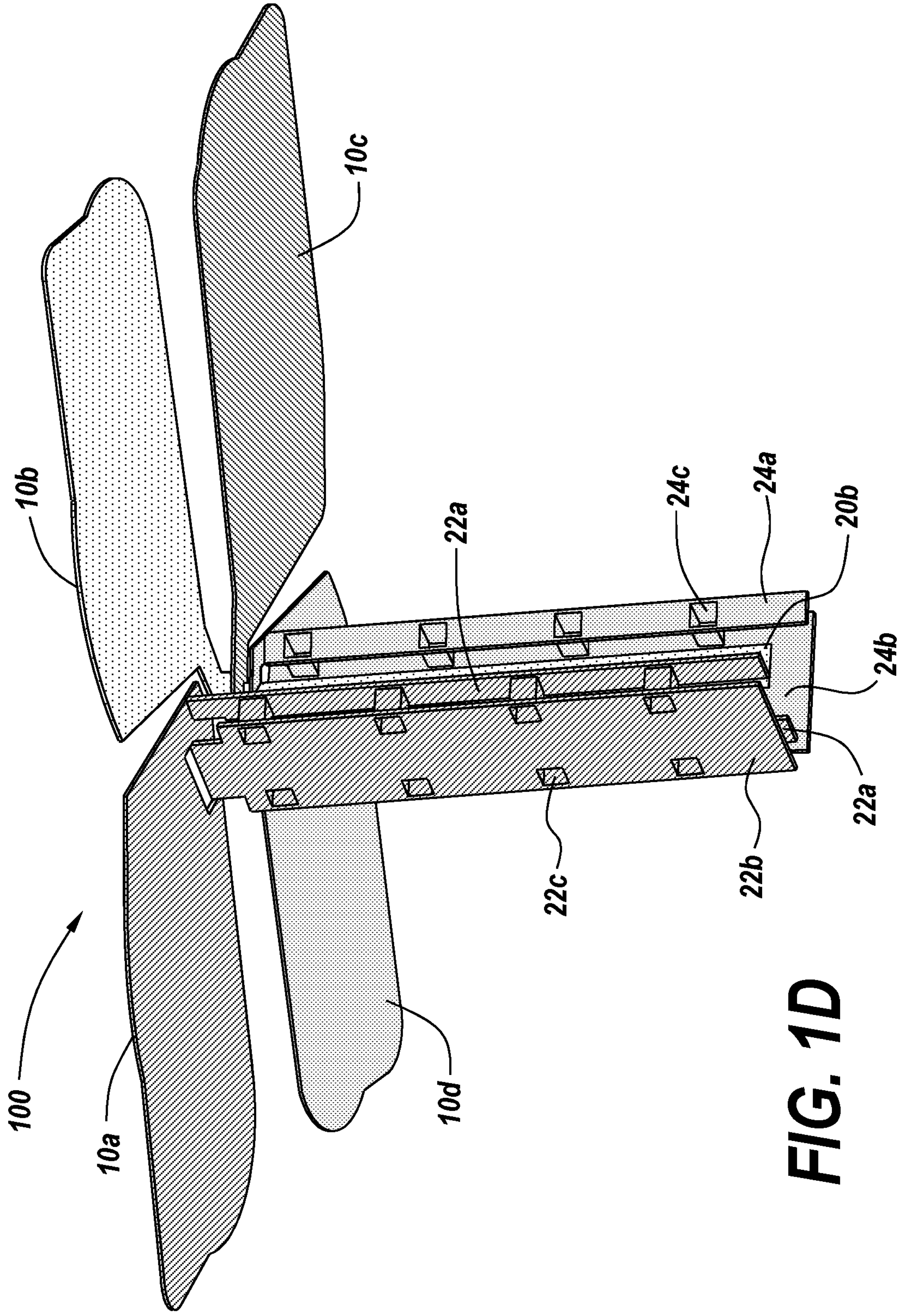
FIG. 1D is a perspective view of a rear side of the polymer-based cross-dipole radiating element of FIG. 1A, but with polymer backing removed to further highlight the arrangement of four distinct metallization patterns associated with two pairs of "cross-polarized" radiating arms.
Figure 1E:
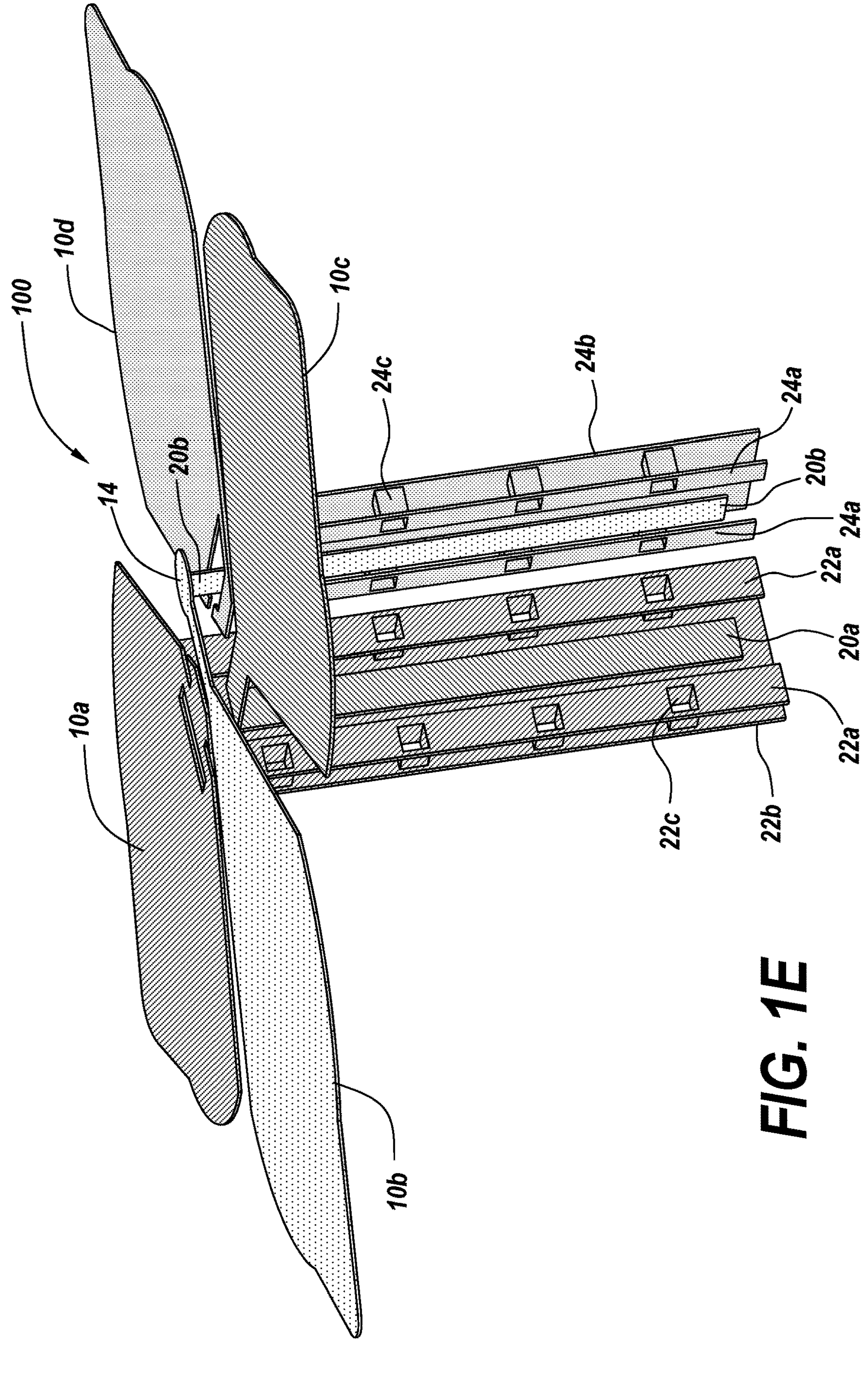
FIG. 1E is a perspective view of a side of the polymer-based cross-dipole radiating element of FIG. 1A, but with polymer backing removed to further highlight the arrangement of four distinct metallization patterns associated with two pairs of radiating arms.
Figure 2A:
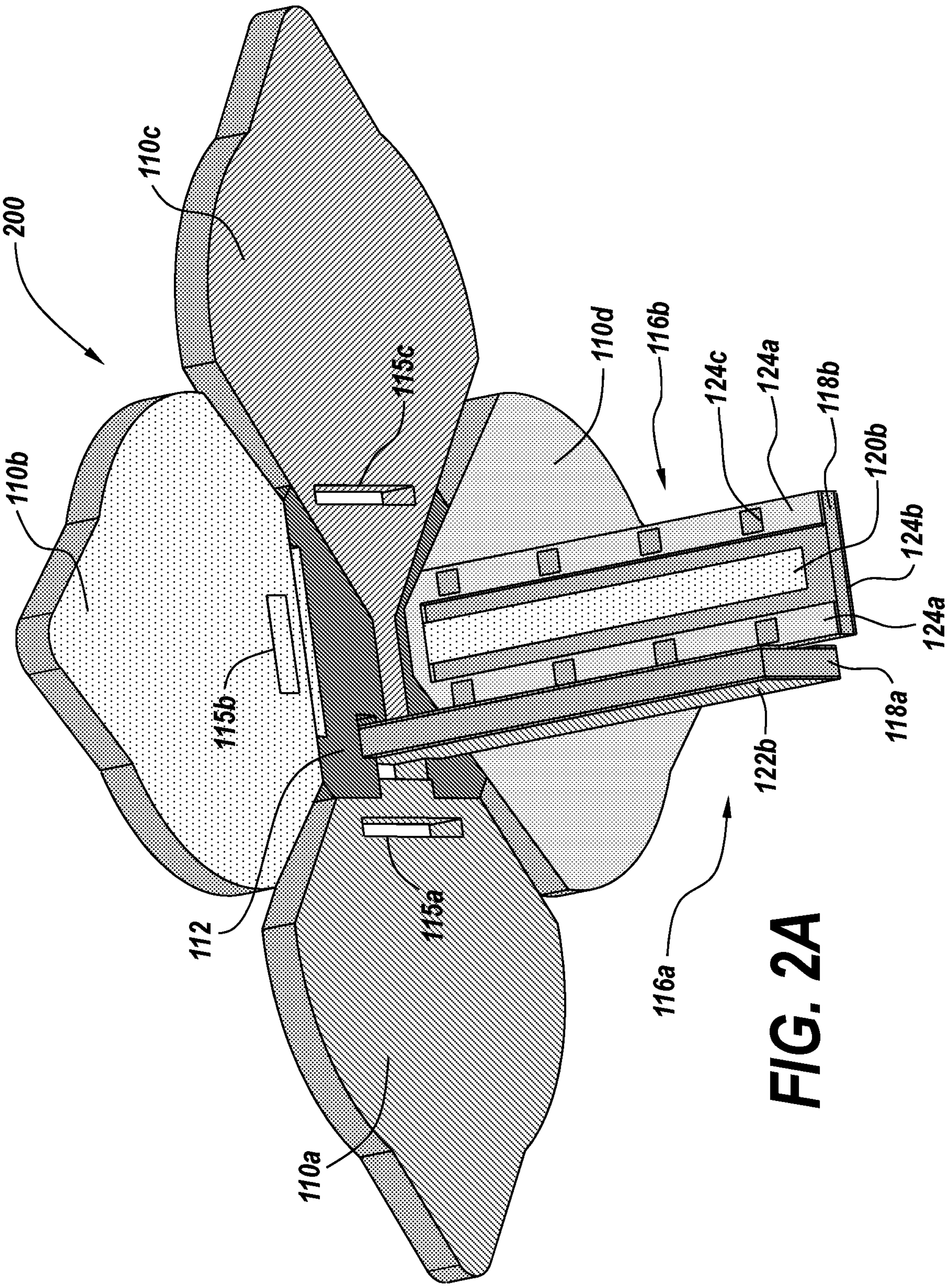
FIG. 2A is a first perspective view of a rear side of a polymer-based radiating element containing a quad-arrangement of double-sided metallized radiating arms with grounded coplanar waveguide (GCPW) feed stalks, according to an embodiment of the invention.
Figure 2B:
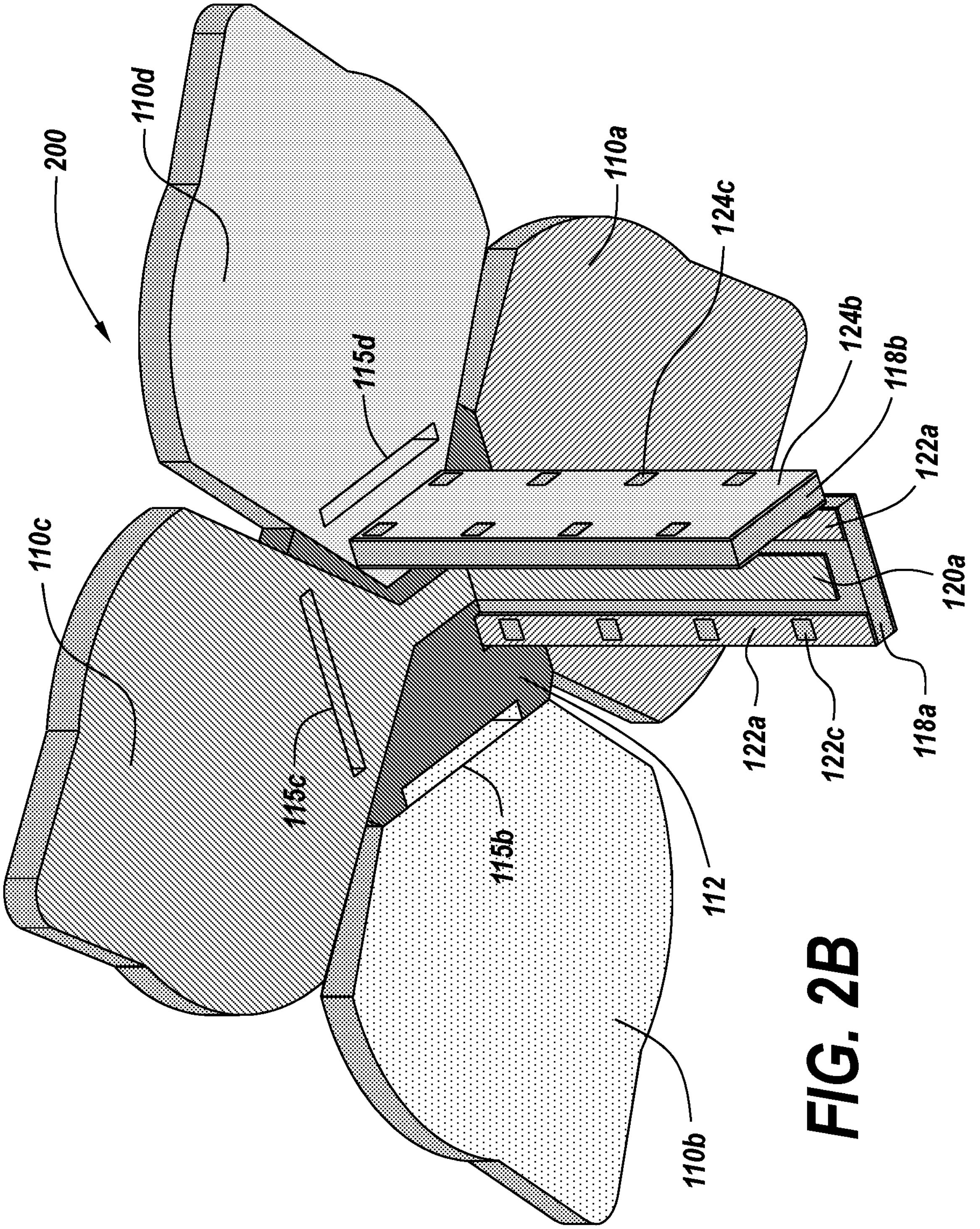
FIG. 2B is a second perspective view of a rear side of a polymer-based radiating element containing a quad-arrangement of double-sided metallized radiating arms with GCPW feed stalks, according to an embodiment of the invention.
Figure 2C:
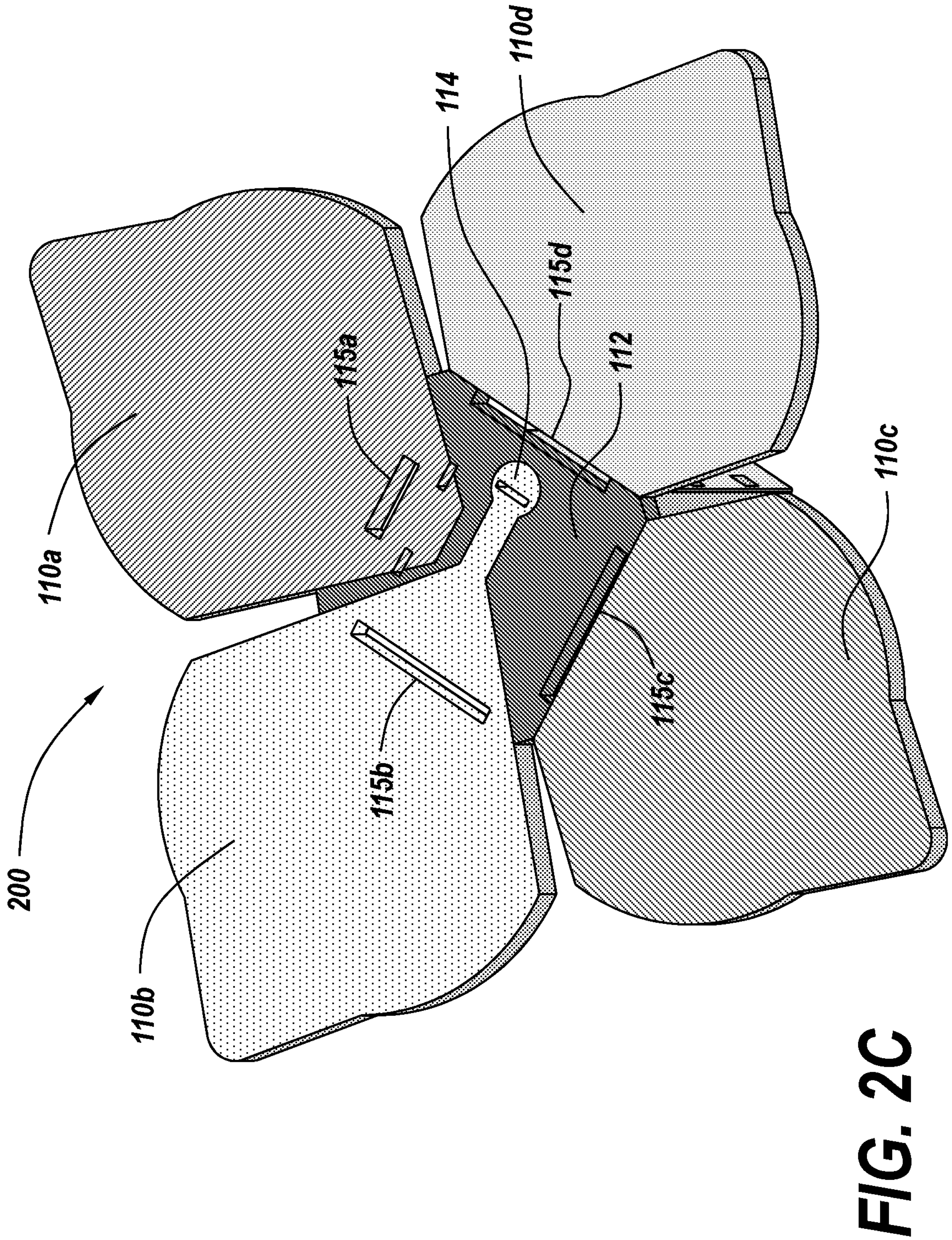
FIG. 2C is an elevated perspective view of the polymer-based radiating element of FIGS. 2A-2B, according to an embodiment of the invention.
Figure 2D:
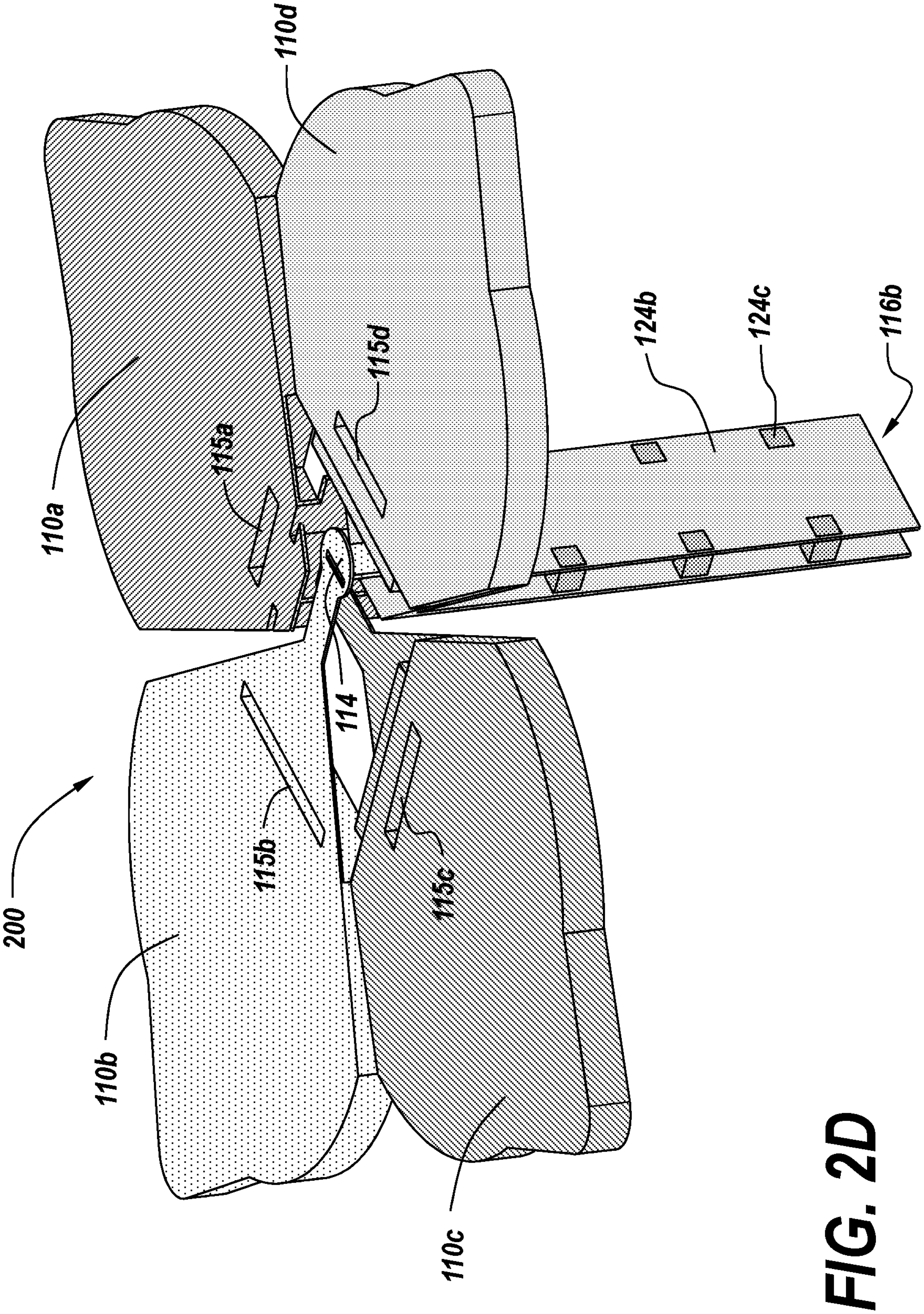
FIG. 2D is a side perspective view of the polymer-based radiating element of FIGS. 2A-2C, but with polymer backing removed to highlight metallized interconnections between the quad-arrangement of radiating arms and underlying feed stalks, according to an embodiment of the invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring now to FIGS. 1A-1E, a radiating element 100 according to an embodiment of the invention is illustrated as including a pair of polymer-based coplanar waveguide feed stalks 16*a*, 16*b*, and first and second pairs of polymer-based radiating arms, which define a cross-polarized radiating element 100 that is supported by and electrically coupled to the coplanar waveguide feed stalks 16*a*, 16*b*. As shown, the first and second pairs of polymer-based radiating arms may be configured from patterned metallization on front and rear facing surfaces of a generally four-sided polymer "arm" substrate 12 (with sidewall 12*a*). In particular, the first pair of radiating arms associated with a first dipole radiating element may include first and second metallization patterns 10*a*, 10*c* on respective front and rear facing surfaces 12*b*, 12*c* of the polymer substrate 12. Likewise, the second pair of radiating arms associated with a second dipole radiating element may include third and fourth metallization patterns 10*b*, 10*d* on respective front and rear facing surfaces 12*b*, 12*c* of the polymer substrate 12, as shown.

As best shown by FIGS. 1A-1B and 1D-1E, the pair of polymer-based coplanar waveguide feed stalks includes a first feed stalk 16*a* and a second feed stalk 16*b*, which may be spaced-apart from the first feed stalk 16*a* and orientated at a right angle relative to the first feed stalk 16*a*. This first feed stalk 16*a* includes a polymer feed stalk substrate 18*a*, a first feed conductor 20*a* on a first surface of the feed stalk substrate 18*a*, and a ground plane 22*b*, which may fully cover a second opposed surface of the feed stalk substrate 18*a*. This ground plane 22*b* is also electrically connected to a first pair of ground plane conductors 22*a* via a plurality of plated through-holes 22*c* (or other conductive structures) in the feed stalk substrate 18*a*. As illustrated, this first pair of ground plane conductors 22*a* extend on opposite sides of the first feed conductor 20*a*, so that the first feed stalk 16*a* (with ground plane 22*b*) operates as a "finite" ground-plane coplanar waveguide (GCPW) feed stalk 16*a*. Moreover, as shown best by FIGS. 1B and 1E, the first feed conductor 20*a* extends the full vertical length of the first feed stalk 16*a* and continues uninterrupted onto the rear facing surface of the polymer arm substrate 12 and into the second metallization "arm" pattern 10*c*, to thereby suppress passive intermodulation (PIM-type) interconnect distortion.

Similarly, the second feed stalk 16*b* includes a polymer feed stalk substrate 18*b*, a second feed conductor 20*b* on a first surface of the feed stalk substrate 18*b*, and a ground plane 24*b* which may fully cover a second opposed surface of the feed stalk substrate 18*b*. This ground plane 24*b* is also electrically connected to a second pair of ground plane conductors 24*a*, via, for example, a plurality of plated through-holes 24*c* in the feed stalk substrate 18*b*. As illustrated, this second pair of ground plane conductors 24*a* extend on opposite sides of the second feed conductor 20*b*, so that the second feed stalk 16*b* (with ground plane 24*b*) operates as a GCPW feed stalk 16*b*. In addition, as shown best by FIGS. 1A, 1C and 1E, the second feed conductor 20*b* extends the full vertical length of the second feed stalk 16*b* and continues uninterrupted (via a plated through-hole and metal extension 14) onto the front facing surface of the polymer arm substrate 12 and into the third metallization "arm" pattern 10*b*.

Referring now to FIGS. 2A-2D, a radiating element 200 according to another embodiment of the invention is illustrated as including a pair of polymer-based coplanar waveguide feed stalks 116*a*, 116*b*, and first and second pairs of polymer-based and double-sided radiating arms, which define a cross-polarized radiating element 200 that is supported by and electrically coupled to the coplanar waveguide feed stalks 116*a*, 116*b*. As shown, the first and second pairs of polymer-based radiating arms may be configured by selectively patterning double-sided metallization on front and rear facing surfaces of a generally four-sided polymer "arm" substrate 112, to thereby support the use of somewhat smaller substrates 112 relative to the embodiment of FIGS. 1A-1E. In particular, the first pair of radiating arms associated with a first dipole radiating element may include first and second double-sided metallization patterns 110*a*, 110*c* on both front and rear facing surfaces of the polymer substrate 112. Likewise, the second pair of radiating arms associated with a second "orthogonal" dipole radiating element may include third and fourth double-sided metallization patterns 110*b*, 110*d* on both front and rear facing surfaces of the polymer substrate 112, as shown. And, the fabrication of these double-sided metallization patterns 110*a*-110*d* may be facilitated by the use of slots 115*a*-115*d* (e.g., rectangular slots) within the polymer substrate 112, which are sufficiently large to support the formation of high conductivity electrical paths (with low PIM) between the front and rear facing surfaces of the polymer substrate 112 and feed stalks 116*a*, 116*b*, during selective metallization.

The pair of polymer-based coplanar waveguide feed stalks includes a first feed stalk 116*a* and a second feed stalk 116*b*, which may be spaced-apart from the first feed stalk 116*a* and orientated at a right angle relative to the first feed stalk 116*a*. This first feed stalk 116*a* includes a polymer feed stalk substrate 118*a*, a first feed conductor 120*a* on a first surface of the feed stalk substrate 118*a*, and a ground plane 122*b*, which may fully cover a second surface of the feed stalk substrate 118*a*. This ground plane 122*b* is electrically connected to a first pair of ground plane conductors 122*a*, via, for example, a plurality of plated through-holes 122*c* in the feed stalk substrate 118*a*. This first pair of ground plane conductors 122*a* extend on opposite sides of the first feed conductor 120*a*, so that the first feed stalk 116*a* (with ground plane 122*b*) operates as a "finite" ground-plane coplanar waveguide (GCPW) feed stalk 116*a*. In addition, as shown best by FIG. 2B, the first feed conductor 120*a* extends the full vertical length of the first feed stalk 116*a* and continues uninterrupted onto the rear facing surface of the second metallization "arm" pattern 110*c* and onto the front facing surface of the second metallization "arm" pattern 110*c* via the rectangular slot 115*c*.

Likewise, the second feed stalk 116*b* includes a polymer feed stalk substrate 118*b*, a second feed conductor 120*b* on a first surface of the feed stalk substrate 118*b*, and a ground plane 124*b*, which may fully cover a second surface of the feed stalk substrate 118*b*. This ground plane 124*b* is electrically connected to a second pair of ground plane conductors 124*a*, via a plurality of plated through-holes 124*c* in the feed stalk substrate 118*b*. As illustrated, this second pair of ground plane conductors 124*a* extend on opposite sides of the second feed conductor 120*b*, so that the second feed stalk 116*b* (with ground plane 124*b*) operates as a GCPW feed stalk 116*b*. In addition, as shown best by FIGS. 2A and 2D, the second feed conductor 120*b* extends the full vertical length of the second feed stalk 116*b* and continues uninterrupted (via a plated through-hole and metal extension 114) onto the front facing surfaces of the polymer substrate 112 and onto the front and rear facing surfaces of the third metallization "arm" pattern 110*b*.

Figure 3A:
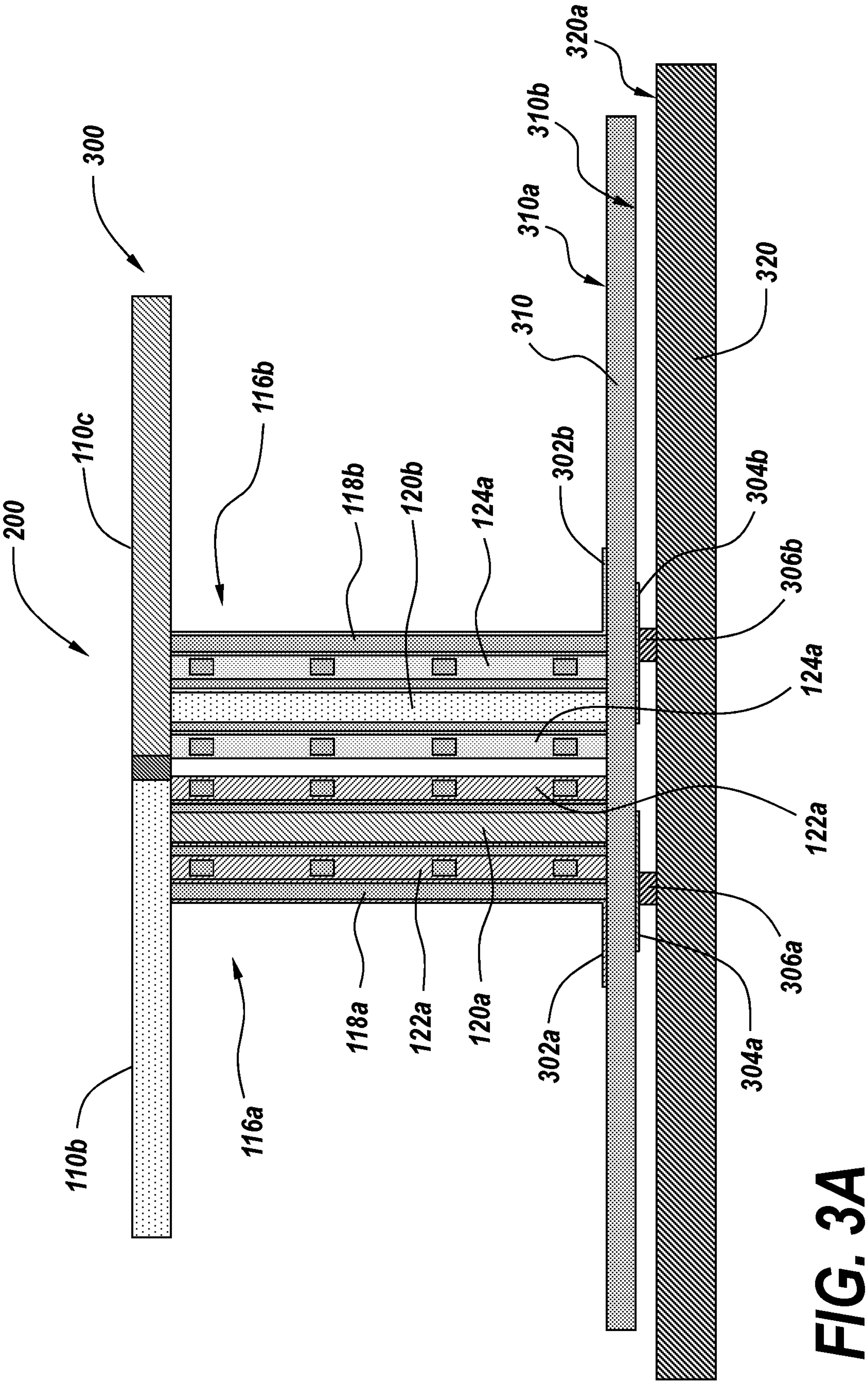
FIG. 3A is a side view of a polymer-based radiating element containing a quad-arrangement of double-sided metallized radiating arms with grounded coplanar waveguide (GCPW) feed stalks and polymer base, on an electrically conductive reflector, according to an embodiment of the invention.
Figure 3B:
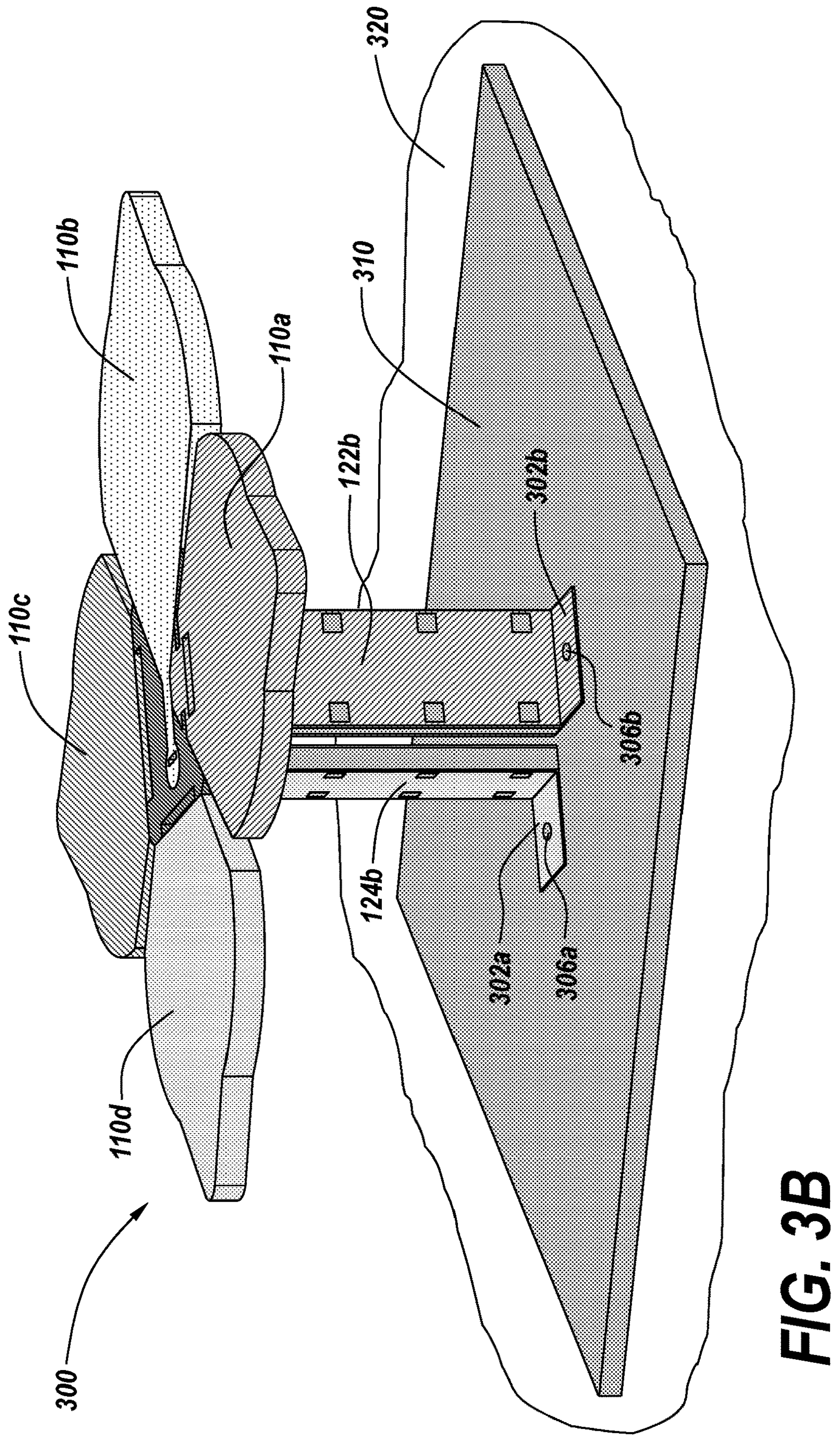
FIG. 3B is an elevated perspective view of the polymer-based radiating element and reflector of FIG. 3A, according to an embodiment of the invention.
Figure 3C:
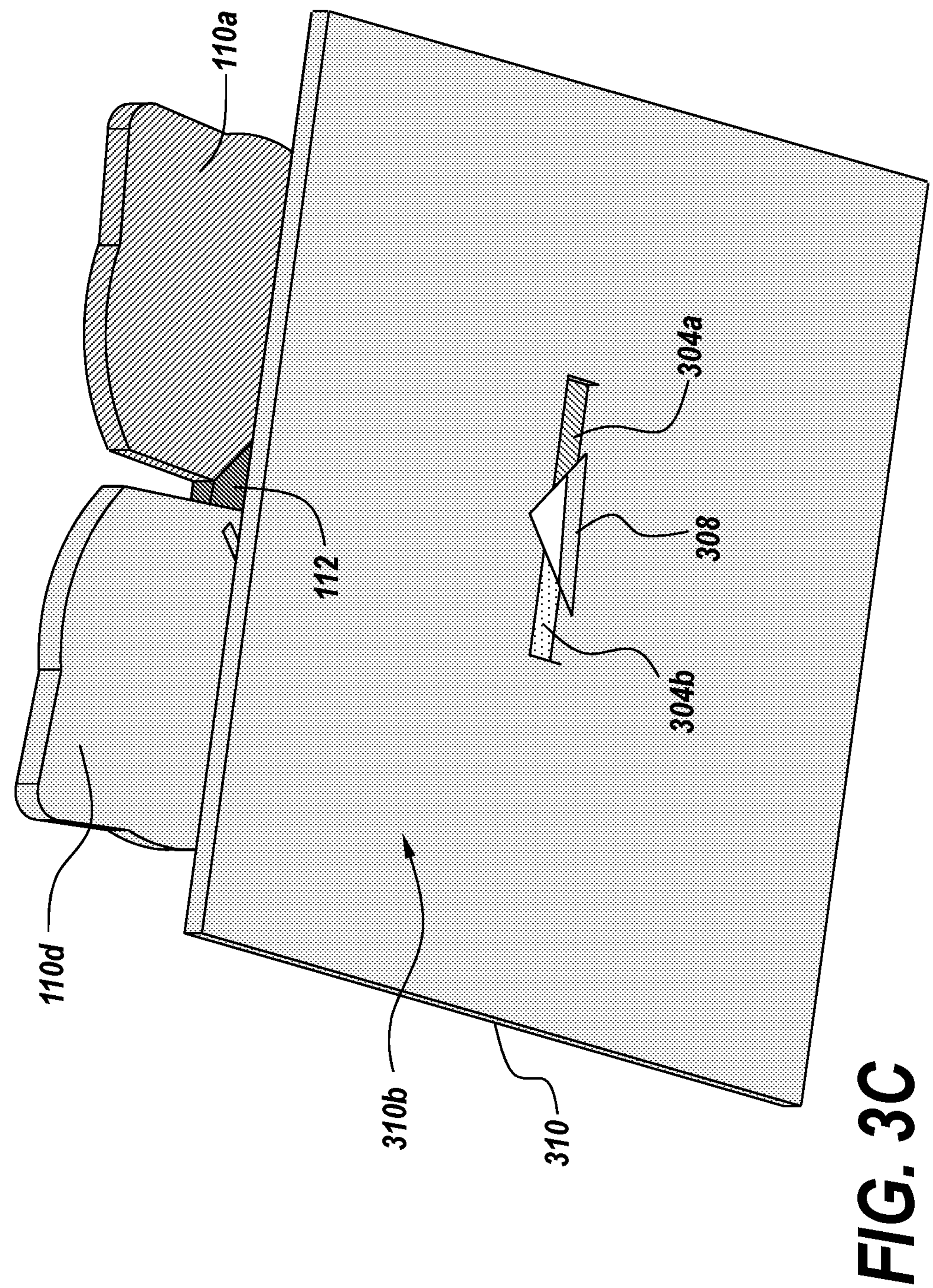
FIG. 3C is a perspective view of a rear side of the polymer-based radiating element of FIGS. 3A-3B, according to an embodiment of the invention.

Referring now to FIGS. 3A-3C, a polymer-based radiating element 300 according to a further embodiment of the invention is illustrated as including a quad-arrangement of double-sided metallized radiating arms with grounded coplanar waveguide (GCPW) feed stalks, as shown by the radiating element 200 of FIGS. 2A-2D, along with a polymer base 310 and an underlying electrically conductive "ground plane" reflector 320. Advantageously, in some embodiments of the invention, the radiating element 200 of FIGS. 2A-2B, including substrate 112 and feed stalks 116*a*, 116*b*, may be integrated with the polymer base 310 as a one-piece unitary polymer-based structure. For example, the radiating element 300 may be formed as a unitary three-dimensional (3D) structure using injection molding fabrication techniques, with polymers such as polyphenylene sulfide (PPS), including glass-fiber reinforced PPS (e.g., PPS GF-40), and liquid crystal polymers. Accordingly, the radiating elements of the embodiments described herein need not be manufactured from independently formed and assembled printed circuit board components (e.g., PCB-based base, feed stalk and arm components). Moreover, these injection molding fabrication techniques may support the formation of a unitary structure having somewhat rounded edges and corners, which support low PIM-type distortion when metallized.

Upon fabrication as a one-piece three-dimensional polymer structure, a surface roughening process may be performed on the unitary polymer structure to facilitate material adhesion. Thereafter, a metal adhesion layer may be deposited onto the entirety of the polymer structure and then selectively removed (e.g., with laser etching) to thereby define a plurality of metal adhesion regions (not shown). These regions can then be "selectively" metallized (e.g., using copper (Cu) and tin (Sn dipping) to thereby define the various functional metal regions described herein. The radiating elements 100 and 200 discussed above may be formed in the same or similar manner.

Furthermore, as shown by FIG. 3A, the polymer base 310 may be at least partially mechanically and electrically secured to the underlying reflector 320 using, for example, a pair of electrically conductive self-clinch fasteners (SCFs), which may be configured as phosphor bronze pins 306*a*, 306*b*, for example. These pins, 306*a*, 306*b*, which may be fixedly attached to the front surface 320*a* of the reflector 320, may be inserted through the polymer base 310 and received within respective metallized ground tabs 302*a*, 302*b*, which are patterned onto a forward surface 310*a* of the base 310. As shown best by FIG. 3B, these ground tabs 302*a*, 302*b* may be provided as extensions of respective feed stalk ground planes 122*b*, 124*b*, so that direct electrical connections, with low passive intermodulation distortion (PIM), can be provided between the ground planes of the respective (GCPW) feed stalks 116*a*, 116*b* and the reflector 320.

In addition, as illustrated by FIGS. 3A and 3C, the metallization on the polymer base 310 may be patterned so that the first and second feed conductors 120*a*, 120*b* (on the first and second (GCPW) feed stalks 116*a*, 116*b*) are electrically connected to corresponding first and second feed lines 304*a*, 304*b*, which are patterned on a rear surface 310*b* of the polymer base 310 and within an opening 308 therein so that an uninterrupted metallization pattern can be provided between the rear surface 310*b* of the polymer base 310 and the first and second feed conductors 120*a*, 120*b* on the feed stalks 116*a*, 116*b*. Although not shown in FIG. 3C, these first and second feed lines 304*a*, 304*b* may be configured to receive a corresponding pair of RF input feed signals, which are provided by an external feed source(s).

Figure 4A:
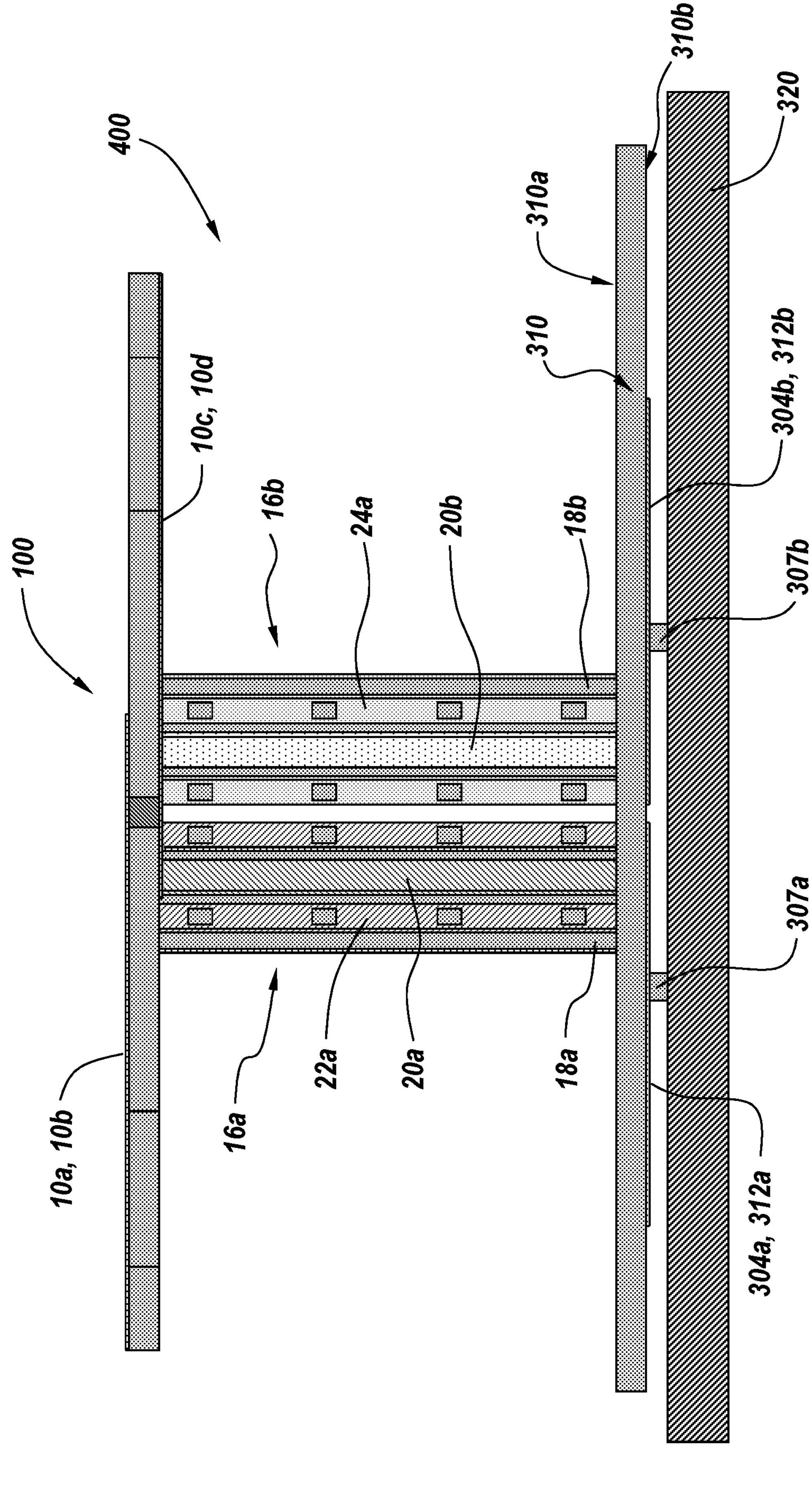
FIG. 4A is a side view of a polymer-based radiating element containing a quad-arrangement of single-sided metallized radiating arms with grounded coplanar waveguide (GCPW) feed stalks, polymer base and quarter-wavelength ($\lambda/4$) open circuit stub, on an electrically conductive reflector, according to an embodiment of the invention.
Figure 4B:
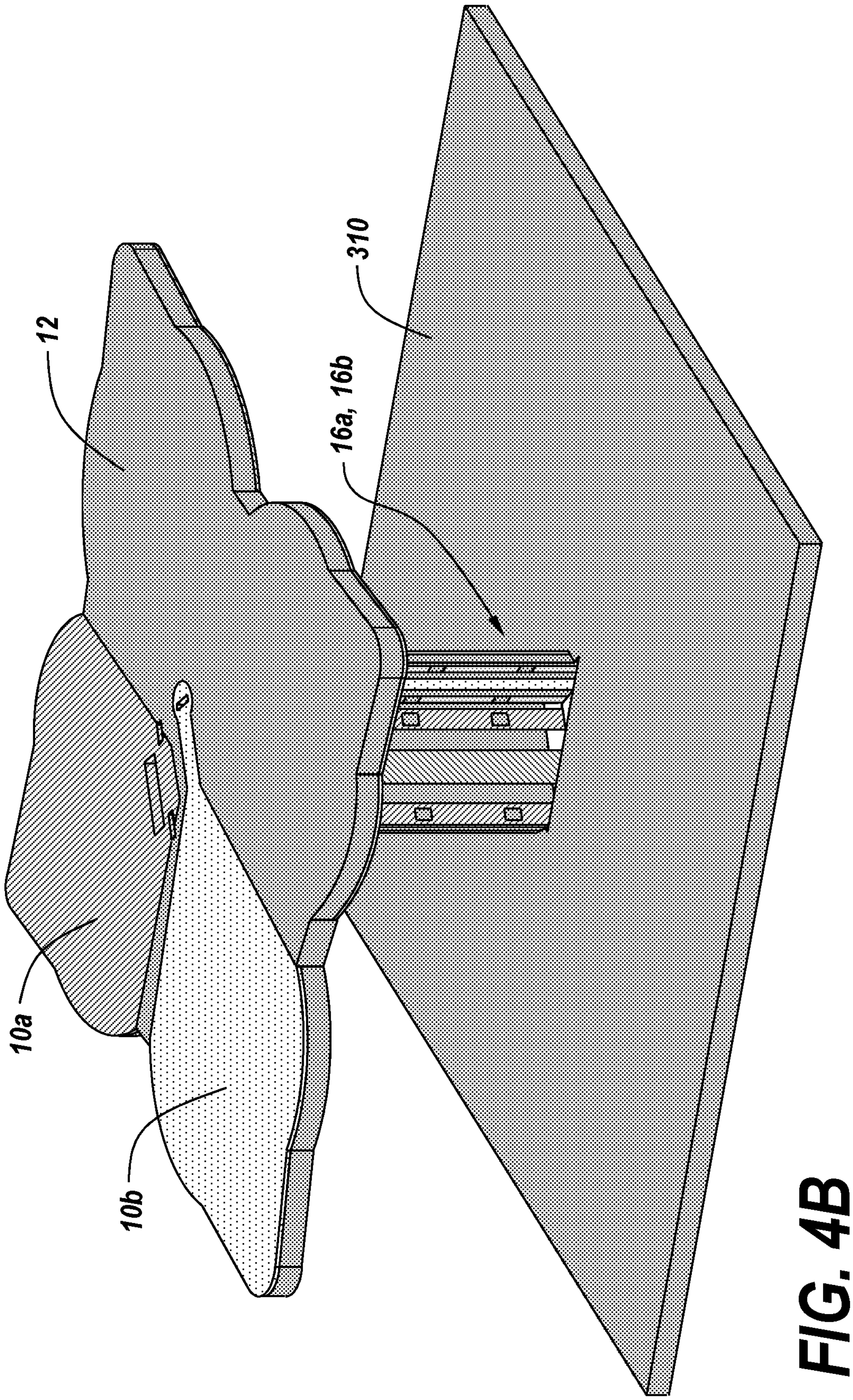
FIG. 4B is an elevated perspective view of the polymer-based radiating element of FIG. 4A, according to an embodiment of the invention.
Figure 4C:
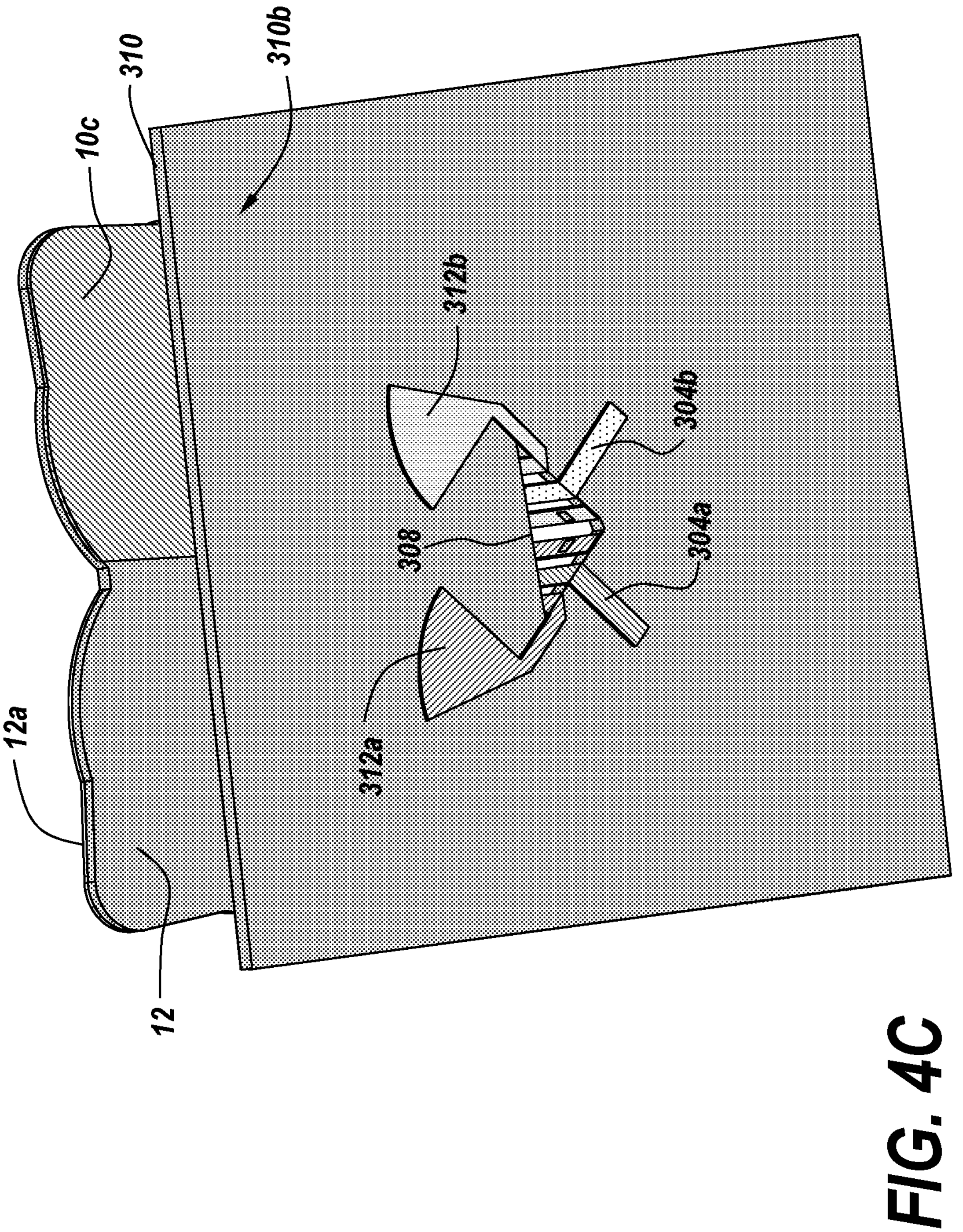
FIG. 4C is a perspective view of a rear side of the polymer-based radiating element of FIGS. 4A-4B, according to an embodiment of the invention.

Referring now to FIGS. 4A-4C, a polymer-based radiating element 400 according to a further embodiment of the invention is illustrated as including: (i) the cross-polarized radiating element 100 of FIGS. 1A-1E, (ii) a polymer base 310, which forms a unitary structure with the radiating element 100, as described hereinabove with respect to FIGS. 3A-3C, and (iii) an underlying electrically conductive reflector 320. As illustrated by FIG. 4A, this polymer base 310 includes a plurality of polymer support posts 307*a*, 307*b*, which space the base 310 at a desired distance from the reflector 320. The base 310 is also formed to have a through opening 308 therein, which extends between its front and rear facing surfaces 310*a*, 310*b*. The polymer base 310 may be selectively metallized so that the first and second feed conductors 20*a*, 20*b* (on the first and second (GCPW) feed stalks 16*a*, 16*b*) are electrically connected to corresponding first and second feed lines 304*a*, 304*b*, which extend on a rear surface 310*b* of the polymer base 310, as air microstriplines, and within the opening 308 therein (so that an uninterrupted metallization pattern can be provided between the rear surface 310*b* of the polymer base 310 and the first and second feed conductors 20*a*, 20*b*).

However, in contrast to the radiating element 300 of FIGS. 3A-3C, there is no direct electrical connection (i.e., DC "short") provided between the ground planes (22*a-c*, 24*a-c*) of the respective (GCPW) feed stalks 16*a*, 16*b* and the underlying reflector 320. Instead, these ground planes 22*a-c*, 24*a-c* are directly connected to respective arc-shaped metallization patterns 312*a*, 312*b*, which are provided on the rear surface 310*b* of the polymer base 310, adjacent the opening 308, and capacitively coupled (across an air gap) to the reflector 320. Although not wishing to be bound by any theory, these arc-shaped metallization patterns 312*a*, 312*b* and connecting thin strip metallization operate, at high frequency, as a capacitively grounded open circuit (OC), which can be advantageously sized in length to correspond to a quarter wavelength (e.g., $\lambda/4$) of a desired operating frequency of the radiating element 400, which may be equivalent to a center frequency of a corresponding operating band. Stated alternatively, these arc-shaped $\lambda/4$ open-circuited patterns 312*a*, 312*b* operate as transmission lines that provide radio frequency (RF) short-circuits (i.e., RF grounding) for the feed stalks 16*a*, 16*b*, but without requiring a direct galvanic connection to the reflector 320, which is often unsolderable due to its material characteristics.

Figure 5A:
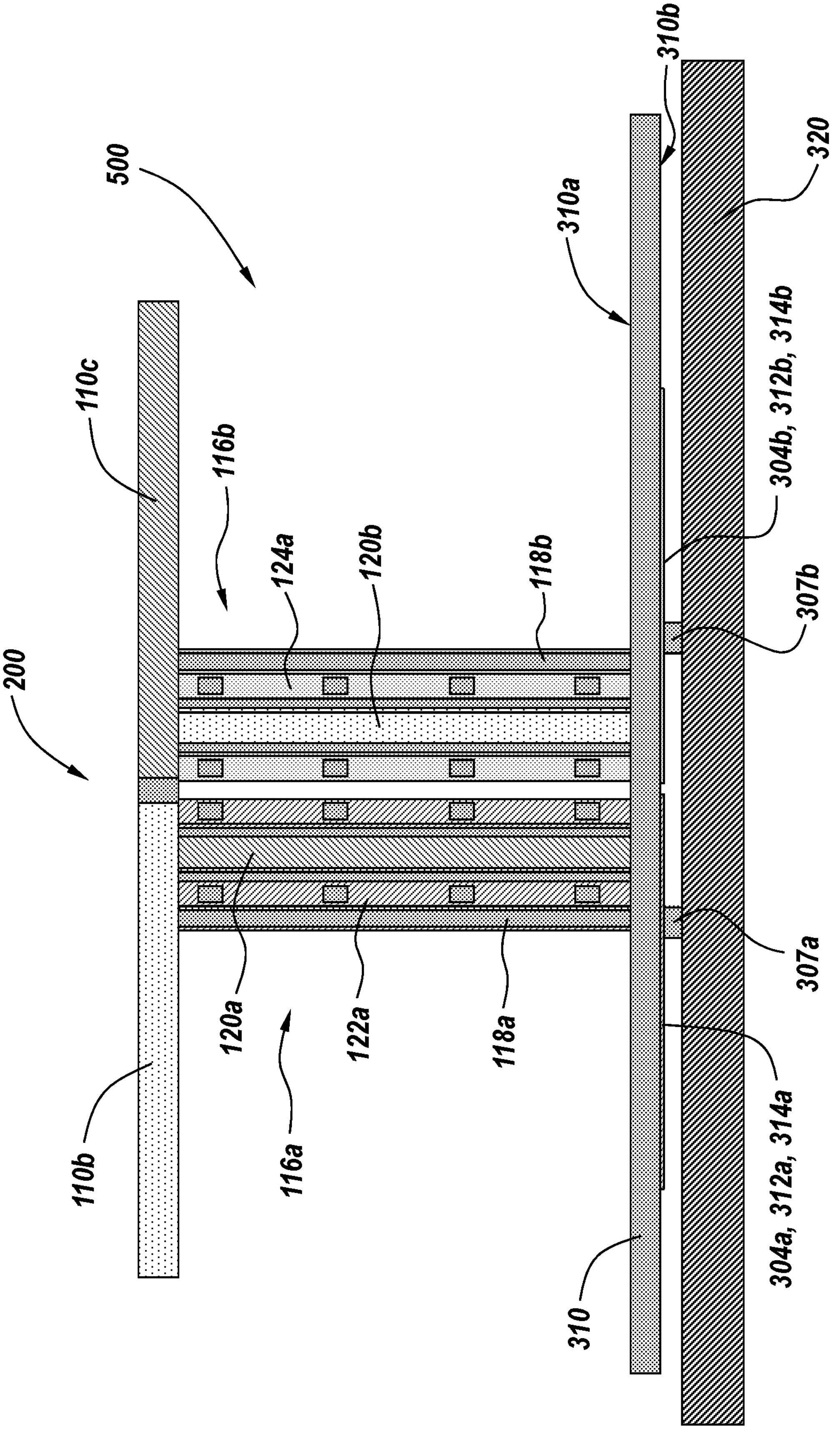
FIG. 5A is a side view of a polymer-based radiating element containing a quad-arrangement of double-sided metallized radiating arms with grounded coplanar waveguide (GCPW) feed stalks, polymer base and quarter-wavelength ($\lambda/4$) open circuit stubs, on an electrically conductive reflector, according to an embodiment of the invention.
Figure 5B:
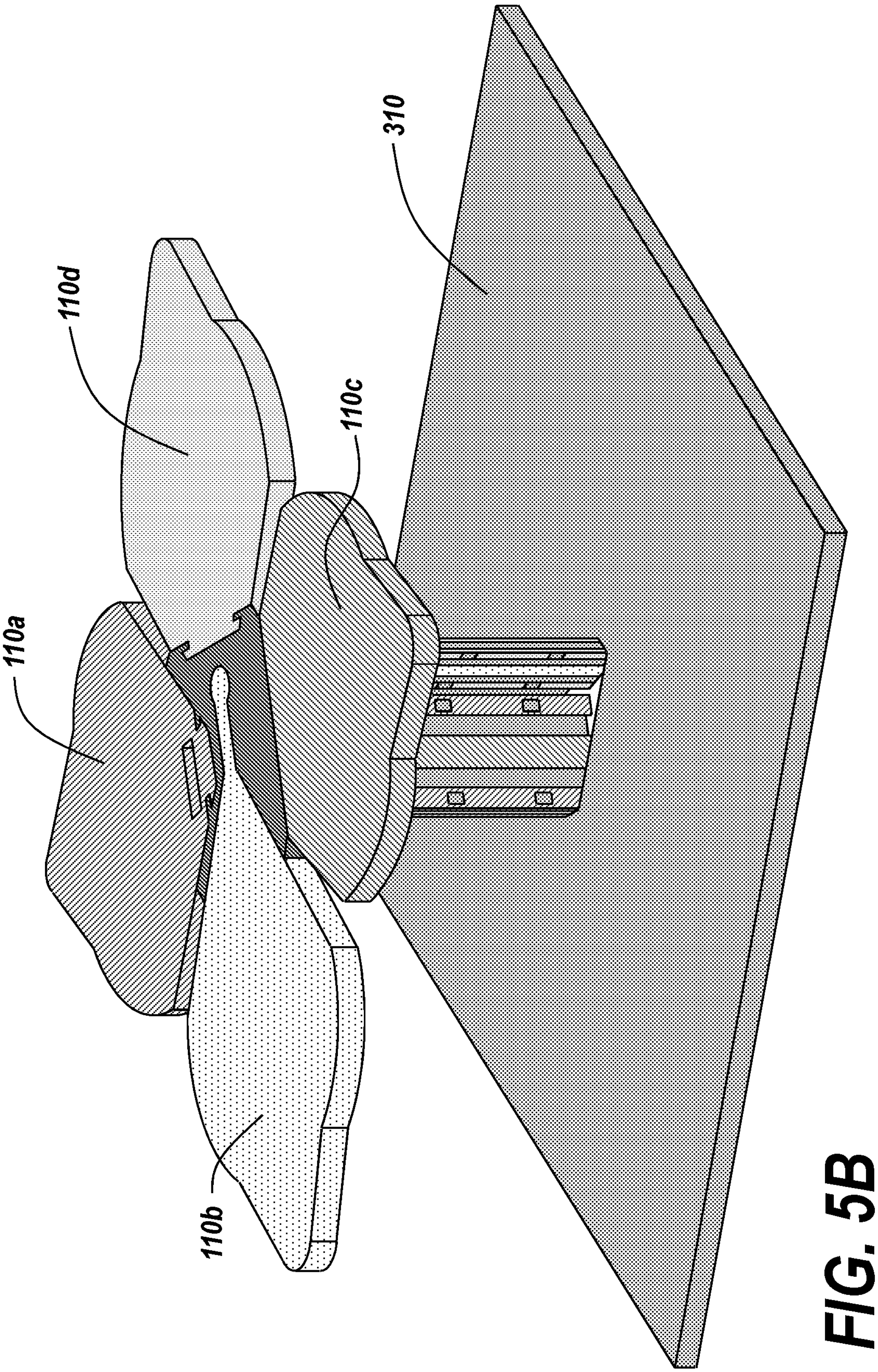
FIG. 5B is an elevated perspective view of the polymer-based radiating element and reflector of FIG. 5A, according to an embodiment of the invention.
Figure 5C:
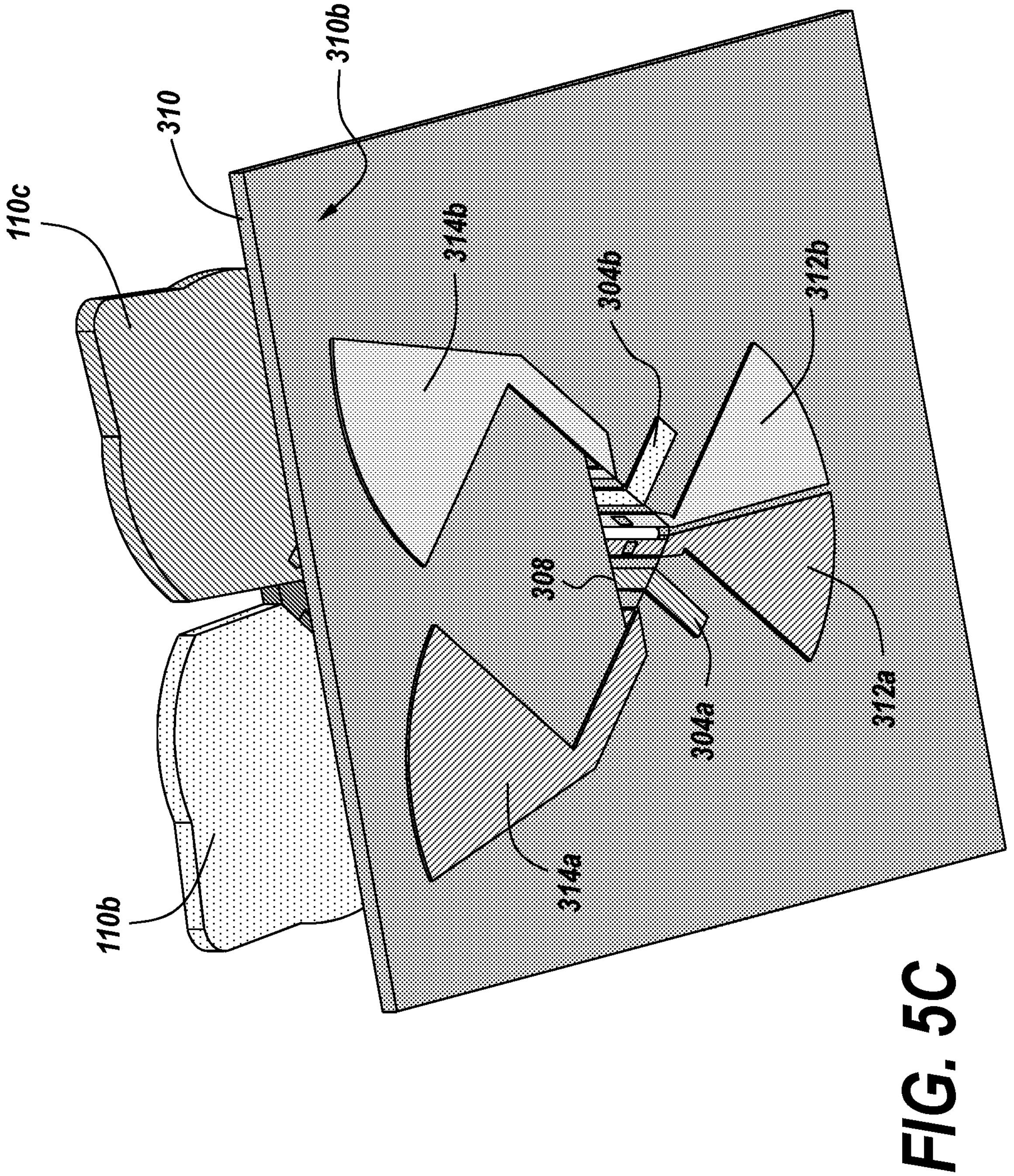
FIG. 5C is a perspective view of a rear side of the polymer-based radiating element of FIGS. 5A-5B, according to an embodiment of the invention.

Referring now to FIGS. 5A-5C, a polymer-based radiating element 500 according to a further embodiment of the invention is illustrated as including: (i) the cross-polarized radiating element 200 of FIGS. 3A-3C, (ii) a polymer base 310, which forms a unitary structure with the radiating element 200, and (iii) an underlying electrically conductive reflector 320. As illustrated by FIG. 5C, the polymer base 310 includes a plurality of polymer support posts 307*a*, 307*b*, which space the base 310 at a desired distance from the reflector 320. The base 310 is also formed to have a through opening 308 therein, which extends between its front and rear facing surfaces 310*a*, 310*b*. The polymer base 310 may be selectively metallized so that the first and second feed conductors 120*a*, 120*b* (on the first and second (GCPW) feed stalks 116*a*, 116*b*) are electrically connected to corresponding first and second feed lines 304*a*, 304*b*. As shown, these feed lines 304*a*, 304*b* extend on a rear surface 310*b* of the polymer base 310, as air microstriplines, and within the opening 308 therein, so that an uninterrupted metallization pattern can be provided between the rear surface 310*b* of the polymer base 310 and the first and second feed conductors 120*a*, 120*b*.

In addition, somewhat like the reflector 400 of FIGS. 4A-4C, the ground planes 122*a-c*, 124*a-c* associated with the first and second feed stalks 116*a*, 116*b* are directly connected to respective pairs of arc-shaped metallization patterns (312*a*, 314*a*) and (312*b*, 314*b*), which are capacitively coupled (across an air gap) to the reflector 320. Although not wishing to be bound by any theory, the first pair of unequally-sized arc-shaped metallization patterns (312*a*, 314*a*) and the second pair of unequally-sized arc-shaped metallization patterns (312*b*, 314*b*) operate, at high frequency and in parallel, as pairs of capacitively grounded open circuits (OC), which can be advantageously sized to correspond to: (i) a quarter wavelength (e.g., $\lambda_1/4$) of a first desired operating frequency (e.g., "low" frequency) within an operating band of the radiating element 500, and (ii) a quarter wavelength (e.g., $\lambda_2/4$) of a second desired operating frequency (e.g., higher frequency) within the operating band.

Figure 6A:
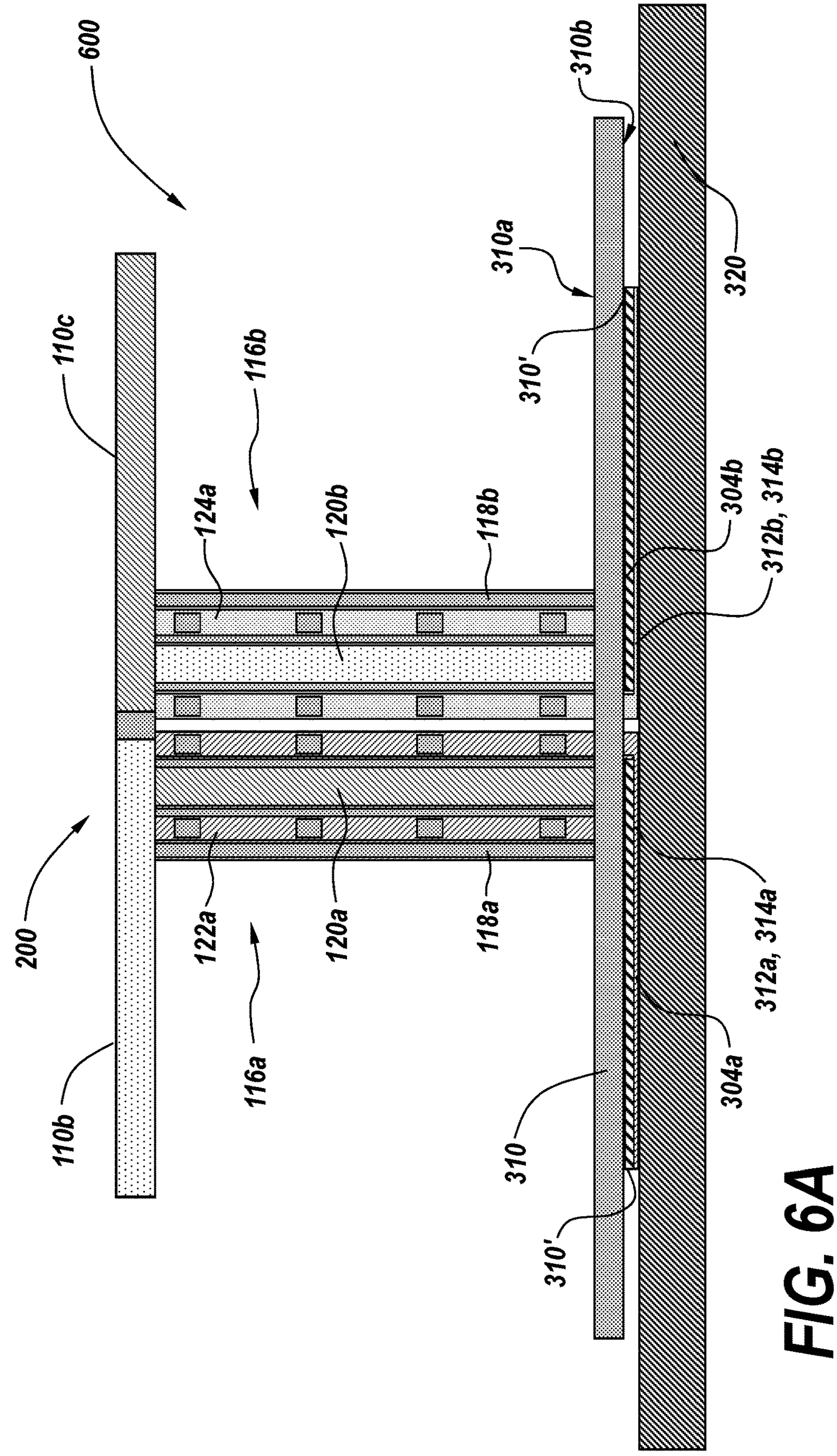
FIG. 6A is a side view of a polymer-based radiating element containing a quad-arrangement of double-sided metallized radiating arms with grounded coplanar waveguide (GCPW) feed stalks, polymer base and quarter-wavelength ($\lambda/4$) open circuit stubs, on an electrically conductive reflector, according to an embodiment of the invention.
Figure 6B:
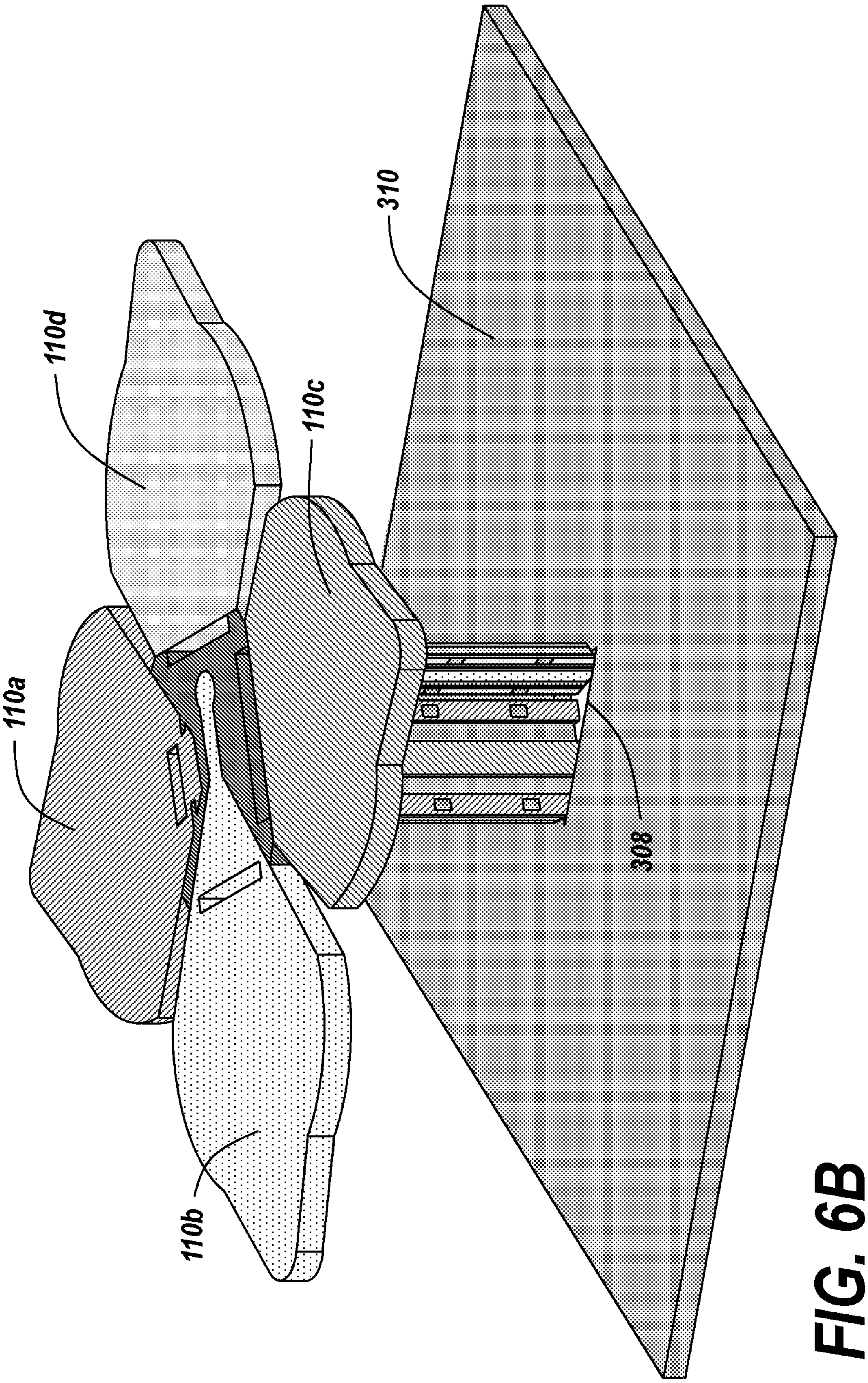
FIG. 6B is an elevated perspective view of the polymer-based radiating element and reflector of FIG. 6A, according to an embodiment of the invention.
Figure 6C:
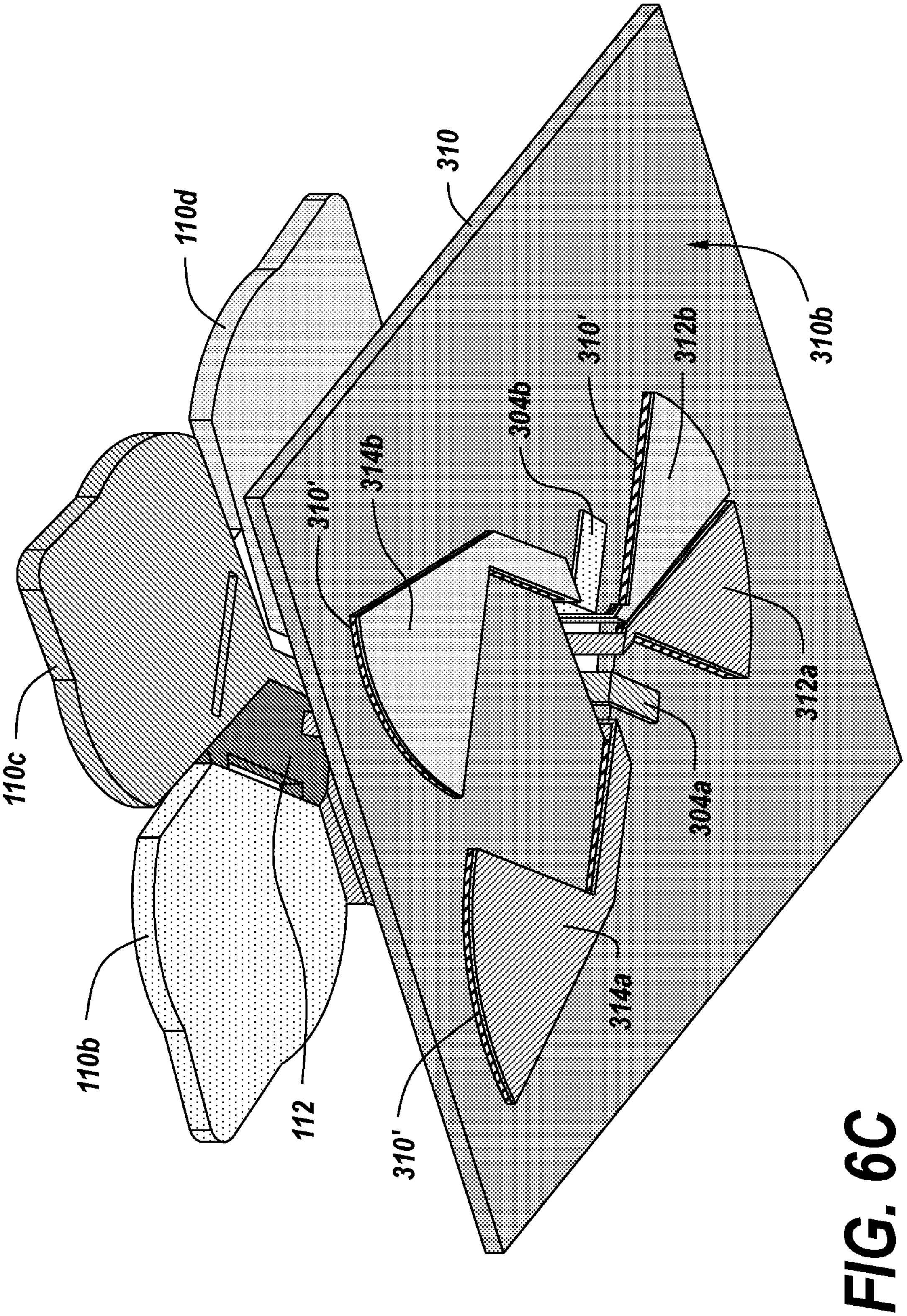
FIG. 6C is a perspective view of a rear side of the polymer-based radiating element of FIGS. 6A-6B, according to an embodiment of the invention.

The use of parallel-connected pairs of capacitively grounded open circuits, as described above with respect to FIGS. 5A-5C to support wider bandwidth performance (with better return loss (RL) and isolation (ISO)), may be further improved by adding raised polymer sectors 310' (e.g., 0.65 mm raised) to the rear facing surface 310*b* of the polymer base 310, as illustrated by the radiating element 600 of FIGS. 6A-6C, which is otherwise equivalent the radiating element 500. As shown by FIGS. 6A and 6C, the use of raised polymer sectors 310' underneath the pairs of arc-shaped metallization patterns (312*a*, 314*a*) and (312*b*, 314*b*), operate to more closely space, and capacitively couple, the arc-shaped metallization patterns to the front surface of the reflector 320, while still maintaining a sufficient gap between the reflector 320 and other portions of the rear-facing surface of the polymer base 310, including between the air microstriplines associated with feed lines 304*a*, 304*b* and the reflector 320.

Figure 6D:
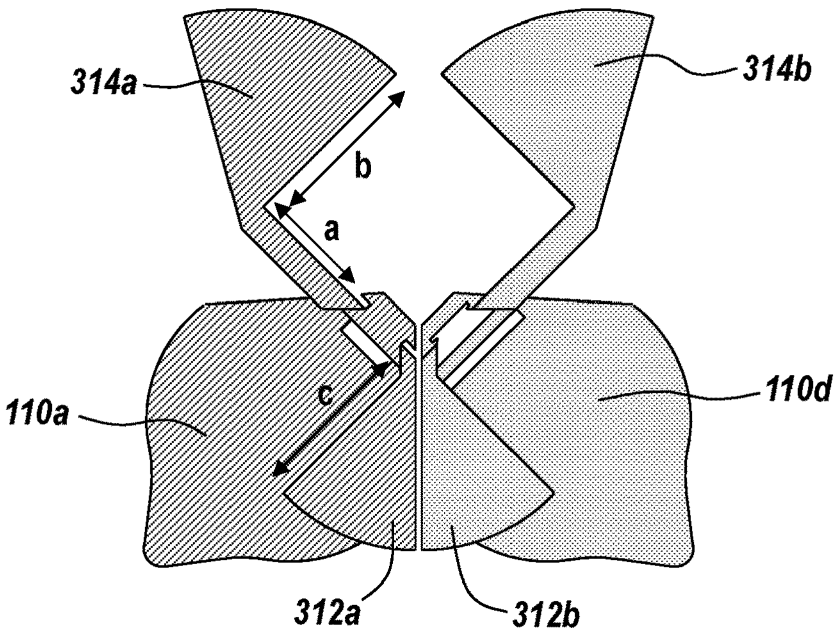
FIG. 6D is a schematic view of the two pairs of arc-shaped metallization patterns (312*a*, 314*a*) and (312*b*, 314*b*) illustrated by FIG. 6C, against a backdrop of the corresponding double-sided metallization patterns 110*a*, 110*d* of FIGS. 6A-6C, according to an embodiment of the invention.

Moreover, as illustrated by the arc-shaped metallization patterns (312*a*, 314*a*) and (312*b*, 314*b*) of FIG. 6D, in order to provide a sufficiently wide overall RF radiating bandwidth, the sum of the orthogonal dimensions a+b associated with the larger arc-shaped patterns 314*a*, 314*b* should correspond to $\lambda/4$ (i.e., a quarter wavelength of a center frequency of a corresponding frequency band). However, if the frequency band is relatively large (e.g., 2.3 GHz to 4.2 GHz), then it may be helpful to treat the large band as being divided into two smaller sub-bands (e.g., 2.2 GHz to 2.7 GHz, and 3.3 GHz to 4.2 GHz), and provide a smaller pair of arc-shaped patterns 312*a*, 312*b*, with dimension "c"=$\lambda/4$ (where, c<a+b), to cover the higher frequency sub-band (i.e., 3.3 GHz to 4.2 GHz), while leaving the larger patterns 314*a*, 314*b* to cover the lower frequency sub-band (e.g., 2.2 GHz to 2.7 GHz).

Figure 7:
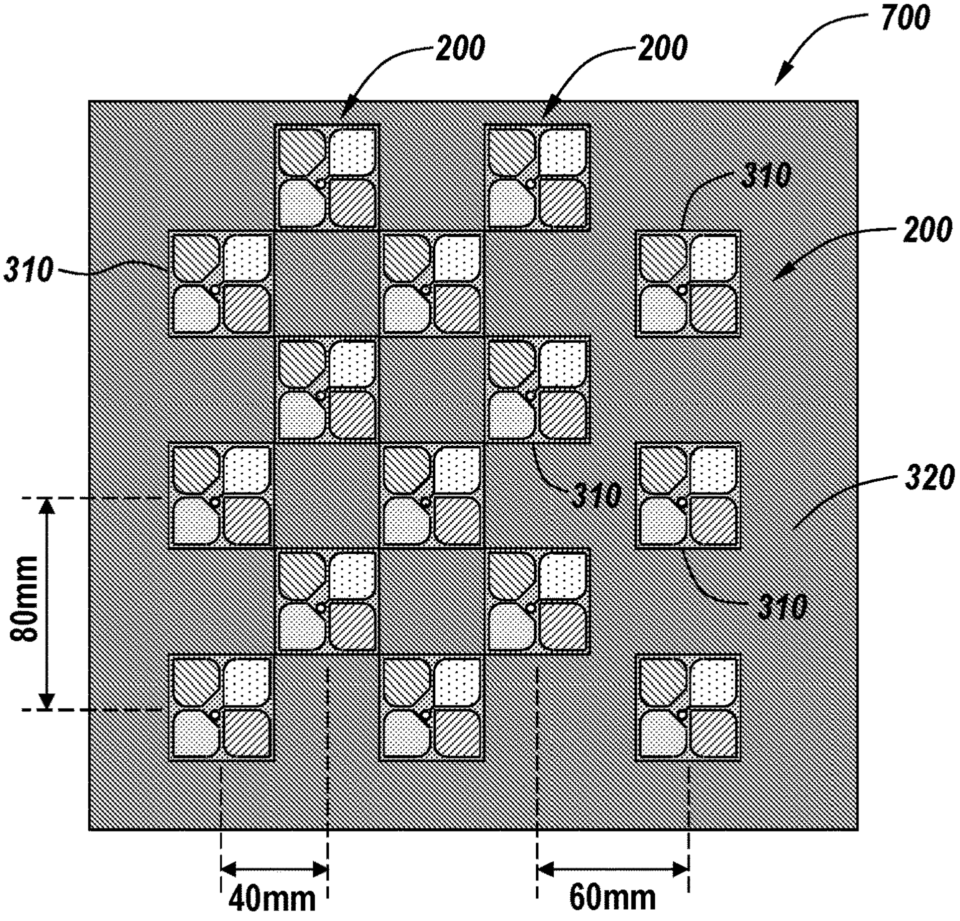
FIG. 7 is a plan view of a multi-band antenna (e.g., time-division duplexing (TDD) beamformer) having a two-dimensional array of the polymer-based radiating elements of FIGS. 6A-6D thereon, according to an embodiment of the invention.

Referring now to FIG. 7, a multi-band antenna 700 (e.g., time-division duplexing (TDD) beamformer), according to an embodiment of the invention, is illustrated as including a two-dimensional array of the unitary polymer-based radiating elements 200 of FIGS. 6A-6D (with polymer bases 310), on an underlying reflector 320. This array is illustrated as including six (6) rows and five (5) columns of radiating elements 200, with all rows and four of the five columns of radiating elements 200 being equally spaced at a row-to-row and column-to-column pitch of 40 mm. In addition, a fifth column of radiating elements 200, which spans only 3 of the 6 rows, is spaced at 60 mm (i.e., 1.5×40 mm) from the nearest fourth column of radiating elements 200, to thereby provide advantageous beam forming characteristics across a relatively wide frequency range. These advantageous beam forming characteristics are more fully described in the aforementioned and commonly assigned U.S. Provisional Application Ser. No. 62/883,279, filed Aug. 6, 2019, entitled "Base Station Antennas Having Multiband Beam-Former Arrays and Related Methods of Operation," the disclosure of which is hereby incorporated herein by reference.

Figure 8A:
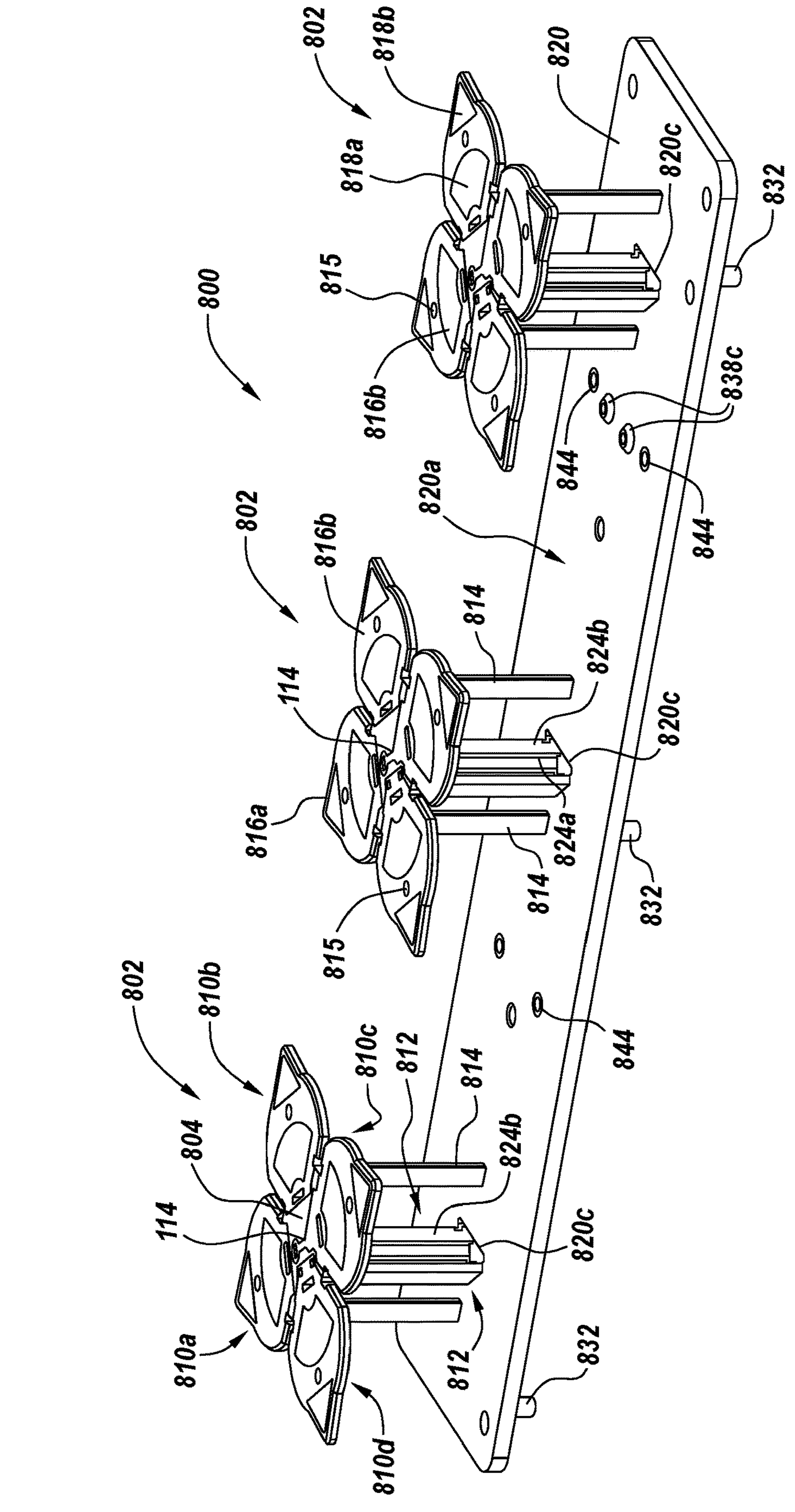
FIG. 8A is an elevated perspective view of a linear array of cross-polarized dipole radiating elements with integrated feed stalks and metallized polymer base, according to an embodiment of the invention.
Figure 8B:
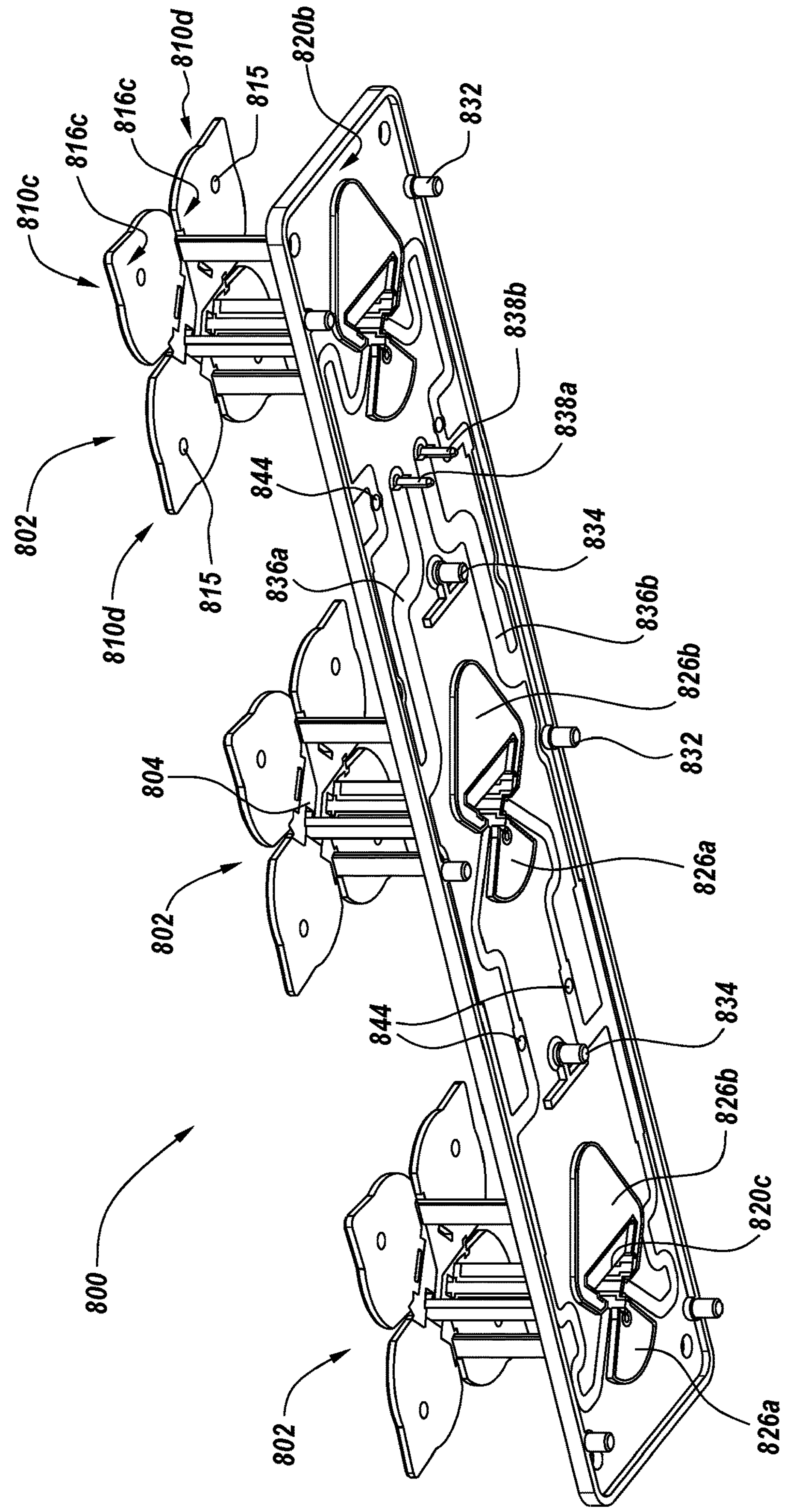
FIG. 8B is an underside perspective view of the linear array of cross-polarized dipole radiating elements of FIG. 8A, according to an embodiment of the invention.

Referring now to FIGS. 8A-8B, a multi-element antenna 800 according to another embodiment of the invention is illustrated as including a plurality of cross-polarized dipole radiating elements 802, which are arranged as a linear array of three radiating elements 802. As illustrated by FIG. 7, this multi-element antenna 800 may be utilized within a column of radiating elements, and within a larger multi-band antenna 700; however, other configurations and numbers of radiating elements 802 are also possible according to other embodiments of the invention.

As shown, each radiating element 802 includes a polymer (e.g., plastic) radiating arm substrate 804, which may be approximately clover-leaf shaped in some embodiments of the invention. The radiating arm substrate 804 is selectively metallized on forward and rear facing surfaces thereof to thereby define two pairs of polymer-based (e.g., polymer-backed) radiating arms (810*a*, 810*c*), (810*b*, 810*d*) that can support cross-polarized (e.g., +45°, −45°) dipole radiation of radio-frequency (RF) feed signals. These polymer-based radiating arms 810*a-d* are supported in front of a forward facing surface 820*a* of an underlying polymer-based base 820 by a pair of polymer-based feed stalks 812, and by a pair of polymer support posts 814 (optional).

In some embodiments of the invention, the feed stalks 812, which may have a rectangular cross-section, are positioned in orthogonal and closely spaced-apart relationship adjacent respective right angle sidewalls of a triangular-shaped opening 820*c* in the base 820. Preferably, each of the right angle sidewalls of the opening 820*c* is coplanar with a primary side/face of a corresponding feed stalk 812, which supports a feed signal metal trace (i.e., feed conductor) and a pair of ground plane conductors thereon, as described more fully hereinbelow.

As shown best by FIG. 8A, each of the polymer-based radiating arms 810*a*-810*d* has a metallized forward-facing surface thereon, which includes: (i) a peripheral metal trace 816*a* that defines a metallized perimeter of the radiating arm 810*a-d*, and (ii) a cross-arm metal trace 816*b*. Each cross-arm metal trace 816*b* extends between first and second portions of the corresponding peripheral metal trace 816*a*, and partitions the forward-facing surface of the corresponding radiating arm 810*a-d* into at least two unmetallized forward-facing regions 818*a*, 818*b*. As shown, these first and second portions of the peripheral metal trace 816*a* are on respective first and second sides of a radiating arm 810*a-d*, which intersect each other at a distal end of the radiating arm 810*a-d*. In addition, at least a majority of the rear-facing surface of each radiating arm 810*a-d* may be metallized 816*c*, and the corresponding peripheral metal trace 816*a* may wrap around an edge of the radiating arm 810*a-d* to thereby electrically connect the metallization 816*c* on the rear-facing surface of the radiating arm 810*a-d* to the metallization on the forward-facing surface of the radiating arm 810*a-d*.

Moreover, to facilitate uniform metallization (e.g., electroplating) of each radiating arm 810*a-d*, a centrally-located metallized through-hole 815 may be provided in each cross-arm metal trace 816*b*, as shown. The cross-arm metal trace 816*b* may also be patterned so that the two unmetallized forward-facing regions include a polygonal-shaped region 818*a* having first and second sides that span respective first and second concentric arcs, and a generally triangular-shaped region 818*b* adjacent a distal end of each radiating arm 810*a-d*. These two unmetallized regions 818*a*, 818*b* may have shapes and dimensions that are optimized to provide a longer effective electrical length to the radiating arms 810*a-d*, which allows for reduced physical dimensions of the radiating elements 802, and improved matching. In addition, although not wishing to be bound by any theory, the cross-arm metal trace 816*b* associated with each radiating arm 810*a-d* may operate to advantageously increase an effective electrical length of each radiating arm 810*a-d* and increase radiating bandwidth.

Each of the pair of polymer-based feed stalks 812 includes a respective feed conductor 824*a* on a first planar surface thereof, which extends forwardly from a sidewall of the opening 820*c* in the base 820 to a corresponding radiating arm (810*b* or 810*c* (via through-hole/metal extension 114)). An opposing second planar surface and sidewalls of each feed stalk 812 may also be covered by a ground plane, which wraps around and continues onto the first surface as a pair of ground plane conductors 824*b*. These ground plane conductors 824*b* can extend along opposing sides of the "centrally-located" feed conductor 824*a* and enable the feed stalk 812 to operate as a grounded coplanar waveguide (GCPW) feed stalk 812, which avoids the use of plated through holes 122*c*, 124*c*, as shown by FIGS. 2A-2D.

Referring still to FIGS. 8A-8B, the polymer base 820, upon which each pair of feed stalks 812 is integrated, includes a pair of unmetallized polymer support posts 814, which extend from a forward facing surface 820*a* of the base 820 to unmetallized rear facing portions of each radiating arm substrate 804. In addition, each of the pair of ground plane conductors 824*b* associated with each of the feed stalks 812 extends through the opening 820*c* in the base 820, and electrically contacts respective terminals associated with a pair of unequally-sized metallization patterns 826*a*, 826*b*, which extend on a rear-facing surface 820*b* of the base 820.

As shown best by FIG. 8B, the pair of unequally-sized metallization patterns 826*a*, 826*b* includes a shared and smaller arc-shaped metallization pattern 826*a* having two terminals, and a shared and larger metallization pattern 826*b* having two terminals (and three or more sides). Advantageously, these two shared metallization patterns 826*a*, 826*b* perform the same function as the two pair of arc-shaped metallization patterns (312*a*, 314*a*) and (312*b*, 314*b*) of FIGS. 6C-6D, but with reduced layout footprint. An edge of the rear-facing surface 820*b* of the base 820 may also include a plurality of polymer posts 832, which are used for heat staking the base 820 to corresponding openings in an underlying antenna reflector (not shown), and a plurality of spacer posts 834 (with T-shaped structure supports), which are used for precise "air-gap" distance control between the rear facing surface 820*b* of the base 820 and the underlying reflector (not shown).

As further shown by the rear-facing surface 820*b* of the base 820 of FIG. 8B, the pair of feed conductors 824*a* associated with each of the three pairs of feed stalks 812 (and corresponding cross-polarized dipole radiating elements 802) are fed by a distributed network of first and second feed signal traces 836*a*, 836*b*. These feed signal traces 836*a*, 836*b* receive first and second cross-polarized feed signals (e.g., Feed 1 (−45°), Feed 2 (+45°)) via respective first and second feed port posts 838*a*, 838*b*, which may attach to mounts 838*c* in the base 820 and extend through corresponding openings within the underlying reflector (not shown).

Figure 9A:
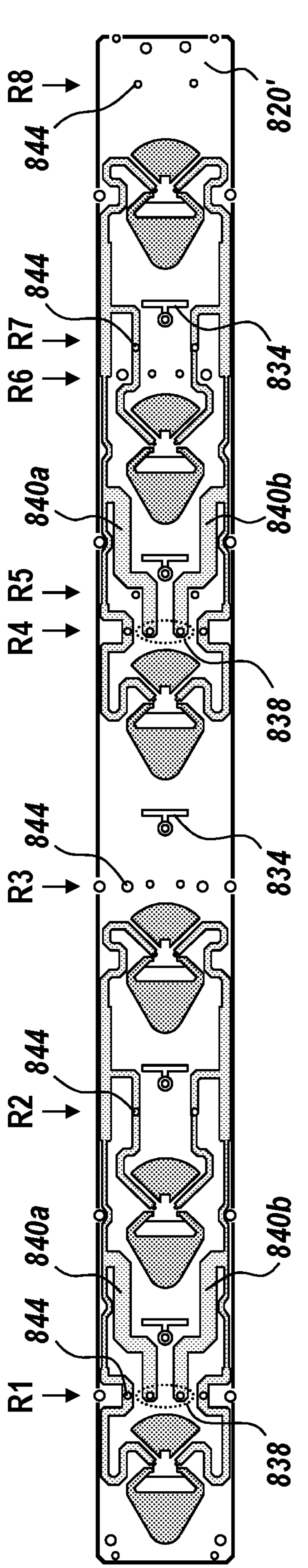
FIG. 9A is a plan view of a rear-facing side of a metallized polymer base of an antenna containing two three-element sub-arrays therein, according to an embodiment of the invention.
Figure 9B:
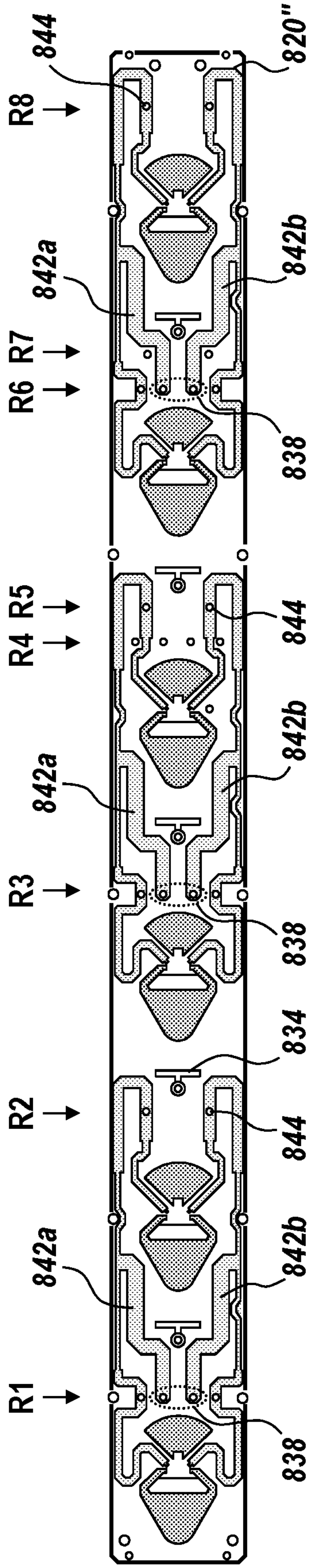
FIG. 9B is a plan view of a rear-facing side of a metallized polymer base of an antenna containing three two-element sub-arrays therein, according to an embodiment of the invention.

According to another embodiment of the invention, and as illustrated by FIG. 9A, the base 820 of FIGS. 8A-8B may be enlarged/elongated to support six radiating elements 802 thereon. The six radiating elements 802 are configured as two groups of three radiating elements 802 per group, which are driven by respective pairs of feed signals received at respective pairs of feed ports 838 within the enlarged 6-element base 820'. Moreover, as shown by FIG. 9B, a similar 6-element base 820" may also be utilized to support six radiating elements 802, which are configured as three groups of two radiating elements 802 per group. Advantageously, prior to "final" trace metallization (e.g., metal bath electroplating), the base 820' of FIG. 9A and the base 820" of FIG. 9B may be configured as identical intermediate base substrates upon which a final customized metallization operation may be performed to yield the base 820' of FIG. 9A (having metal traces 840*a*, 840*b*) or the base 820" of FIG. 9B (having metal traces 842*a*, 842*b*). In particular, prior to final trace metallization/electroplating, the intermediate base substrate associated with the bases 820', 820" of FIGS. 9A-9B includes an excess number of metallized through-hole vias 844, which are distributed across the intermediate base substrate in a plurality of linear 2-via and 4-via rows R1-R8. These metallized through-hole vias 844 operate as electroplating terminals (along with electroplating hooks (not shown)) during metal bath metallization to thereby provide final "customization" to the base 820' of FIG. 9A or the base 820" of FIG. 9B. Thus, as shown by the base 820' of FIG. 9A versus the base 820" of FIG. 9B, only respective subsets of the metallized through-hole "electroplating" vias 844 are utilized to provide final customization into a "3-3" radiating element configuration (FIG. 9A) or a "2-2-2" radiating element configuration (FIG. 9B). Accordingly, potentially expensive retooling costs can be avoided when manufacturing antennas having varying radiating element configurations and base requirements.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A dipole radiating element, comprising:

a polymer-based coplanar waveguide feed stalk; and a polymer-based pair of radiating arms supported by and electrically coupled to said coplanar waveguide feed stalk.

2. The radiating element of claim 1, wherein said coplanar waveguide feed stalk is a grounded coplanar waveguide (GCPW) feed stalk.

3. The radiating element of claim 2, further comprising a reflector upon which the GCPW stalk is supported, said reflector electrically coupled to a metallized ground plane on the GCPW feed stalk.

4. The radiating element of claim 2, wherein a first of the pair of radiating arms is electrically coupled to a feed conductor on the GCPW feed stalk and a second of the pair of radiating arms is electrically coupled to a metallized ground plane on the GCPW feed stalk.

5. The radiating element of claim 4, wherein the feed conductor is provided on a first side of the GCPW feed stalk and the metallized ground plane is provided on a second side and on the first side of the GCPW feed stalk; and wherein the feed conductor is centered between first and second portions of the metallized ground plane on the first side of the GCPW feed stalk.

6. The radiating element of claim 5, wherein said GCPW feed stalk comprises a plurality of plated through-holes therein; and wherein the first and second portions of the metallized ground plane on the first side of the GCPW feed stalk are electrically coupled by the plurality of plated through-holes to a third portion of the metallized ground plane on the second side of the GCPW feed stalk.

7. The radiating element of claim 5, wherein the third portion of the metallized ground plane and the second of the pair of radiating arms are collectively configured as an uninterrupted layer of metallization that extends between the third portion of the metalized ground plane and a rear-facing surface of the second of the pair of radiating arms.

8. The radiating element of claim 5, wherein the feed conductor and the first of the pair of radiating arms are collectively configured as an uninterrupted layer of metallization that extends between the feed conductor and a rear-facing surface of the first of the pair of radiating arms.

9. The radiating element of claim 8, wherein the second of the pair of radiating arms has at least one metallized through-hole therein; and wherein the third portion of the metallized ground plane and the second of the pair of radiating arms are collectively configured as an uninterrupted layer of metallization that extends from the third portion of the metalized ground plane, through the at least one metallized through-hole and onto a front-facing surface of the second of the pair of radiating arms.

10. The radiating element of claim 5, wherein the second side of the GCPW feed stalk is entirely covered by the metallized ground plane.

11. A dipole radiating element, comprising:

a polymer base having front and rear facing surfaces thereon;

a polymer-based coplanar waveguide feed stalk, on a front facing surface of said polymer base; and a polymer-based pair of radiating arms supported by and electrically coupled to said coplanar waveguide feed stalk.

12. The radiating element of claim 11, wherein said coplanar waveguide feed stalk is a grounded coplanar waveguide (GCPW) feed stalk.

13. The radiating element of claim 12, further comprising:

a reflector upon which the polymer base is supported;

an air microstrip feedline, which extends on a rear facing surface of said polymer base and opposite said reflector, said air microstrip feedline electrically coupled through an opening in said polymer base to a feed conductor on the GCPW feed stalk; and a first open circuit terminal, which extends on the rear facing surface of said polymer base and is capacitively coupled to a first electrically conductive portion of said reflector, said first open circuit terminal electrically coupled through the opening in said polymer base to a first portion of a metallized ground plane on the GCPW feed stalk.

14. The radiating element of claim 12, further comprising:

a reflector upon which the polymer base is supported; and an air microstrip feedline, which extends on a rear facing surface of said polymer base and opposite said reflector, said air microstrip feedline electrically coupled through an opening in said polymer base to a feed conductor on the GCPW feed stalk.

15. The radiating element of claim 14, wherein a metallized ground plane on the GCPW feed stalk is capacitively ground-shorted to the reflector via a quarter-wavelength ($\lambda/4$) open circuit, where $\lambda$ is the wavelength corresponding to a center frequency of a first band supported by the dipole radiating element.

16. The radiating element of claim 15, wherein the λ/4 open circuit comprises at least one arc-shaped metallization pattern on the rear facing surface of said polymer base.

17. The radiating element of claim 11, wherein said polymer base, said polymer-based coplanar waveguide feed stalk, and said polymer-based pair of radiating arms share a common unitary polymer substrate.

18. A radiating element, comprising:

a polymer base having an opening therein;

first and second polymer-based coplanar waveguide feed stalks on a forward-facing surface of said polymer base, adjacent the opening;

first and second pairs of radiating arms on the first and second feed stalks;

a first feed conductor and a first pair of ground plane conductors on a first surface of the first feed stalk;

a second feed conductor and a second pair of ground plane conductors on a first surface of the second feed stalk; and first and second unequally-sized metallization patterns on a rear-facing surface of the polymer base, said first metallization pattern having first and second terminals electrically connected to a first one of the first pair of ground plane conductors and a first one of the second pair of ground plane conductors, and said second metallization pattern having first and second terminals electrically connected to a second one of the first pair of ground plane conductors and a second one of the second pair of ground plane conductors.

19. The radiating element of claim 18, wherein at least one of the first and second metallization patterns is a generally arc-shaped metallization pattern.

20. The radiating element of claim 18, wherein the opening in the polymer base has metal traces on sidewalls thereof, which electrically connect the terminals of the first and second unequally-sized metallization patterns to corresponding ones of the ground plane conductors within the first and second pairs of ground plane conductors.

* * * * *